United States Patent [19]
Stypula et al.

[11] Patent Number: 4,877,629
[45] Date of Patent: * Oct. 31, 1989

[54] PROCESS FOR PREPARING A COATED FOOD PRODUCT

[75] Inventors: Richard J. Stypula, Colts Neck; Lawrence Buckholz, Jr., Jackson, both of N.J.

[73] Assignee: International Flavors & Fragrances Inc., New York, N.Y.

[*] Notice: The portion of the term of this patent subsequent to Oct. 31, 2006 has been disclaimed.

[21] Appl. No.: 205,358

[22] Filed: Jun. 10, 1988

[51] Int. Cl.$^4$ .................... A23L 1/314; A23L 1/315; A23L 1/317
[52] U.S. Cl. .................................... 426/302; 426/92; 426/102; 426/303; 426/533; 426/644; 426/646
[58] Field of Search .................... 426/89, 92, 93, 102, 426/291, 292, 293, 296, 302, 615, 637, 641, 643, 644, 646, 656, 533, 534, 650, 303

[56] References Cited
U.S. PATENT DOCUMENTS
4,778,684 10/1988 D'Amico et al. .................... 426/291

Primary Examiner—Arthur L. Corbin
Attorney, Agent, or Firm—Arthur L. Liberman

[57] ABSTRACT

Described is a process for preparing a batter-coated, barrier layer-coated flavored porous inner food structure containing macerated beef or macerated chicken having the properties of:

(x) retention of a substantial quantity of the water originally contained in the macerated beef or macerated chicken structure on re-cooking;

(y) substantial imperviousness to the absorption or adsorption of cooking oil into the resulting product when the resulting product is contacted with cooking oil on further cooking (re-cooking) subsequent to the cooking step required to prepare the product; and (z) retention of substantially all of the flavor nuances originally present in the macerated chicken or macerated beef on re-cooking beyond the original cooking step used to produce the product originally.

The barrier coating consists of a starch, methyl cellulose, xanthan gum as well as a reaction flavor composition and/or reaction flavor precursor composition.

7 Claims, 13 Drawing Sheets

FIG.3
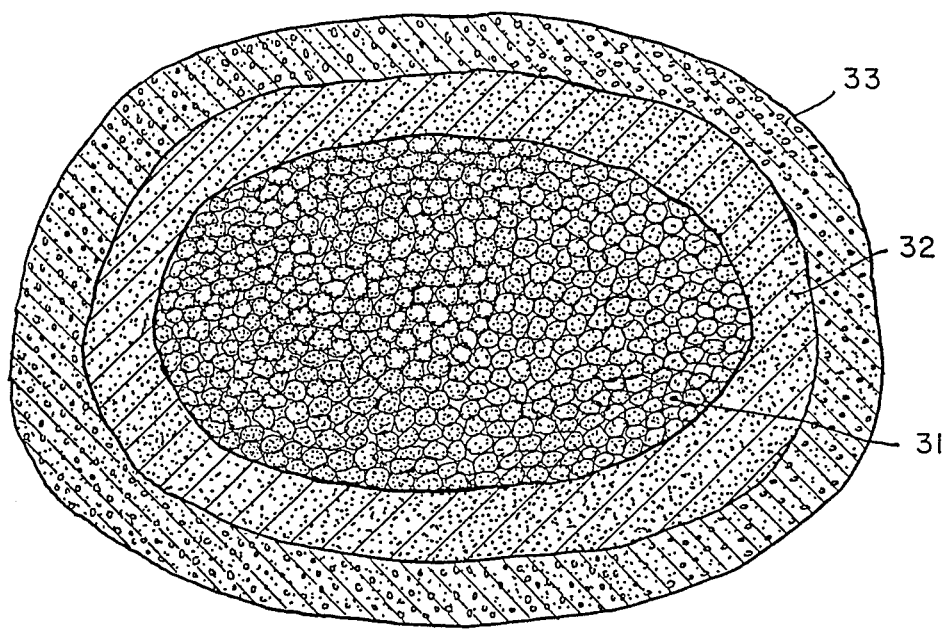
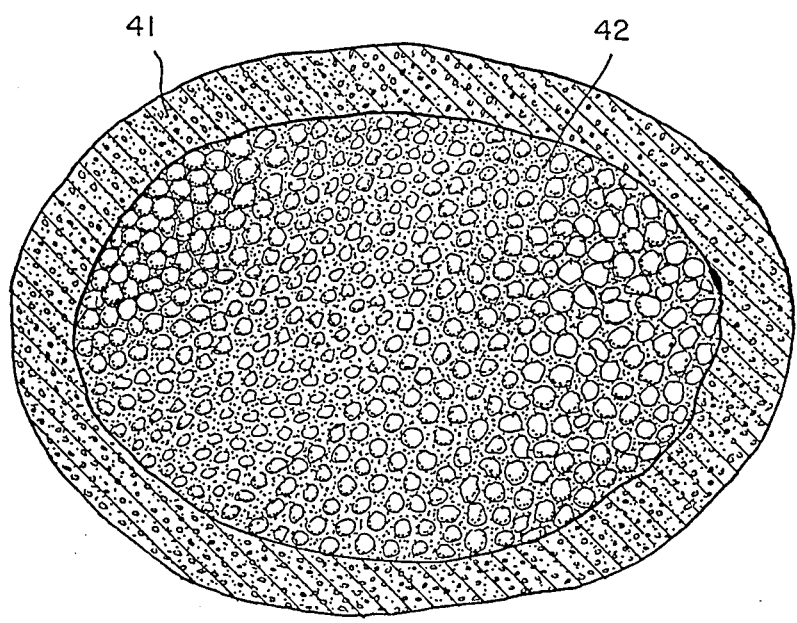
FIG.4A

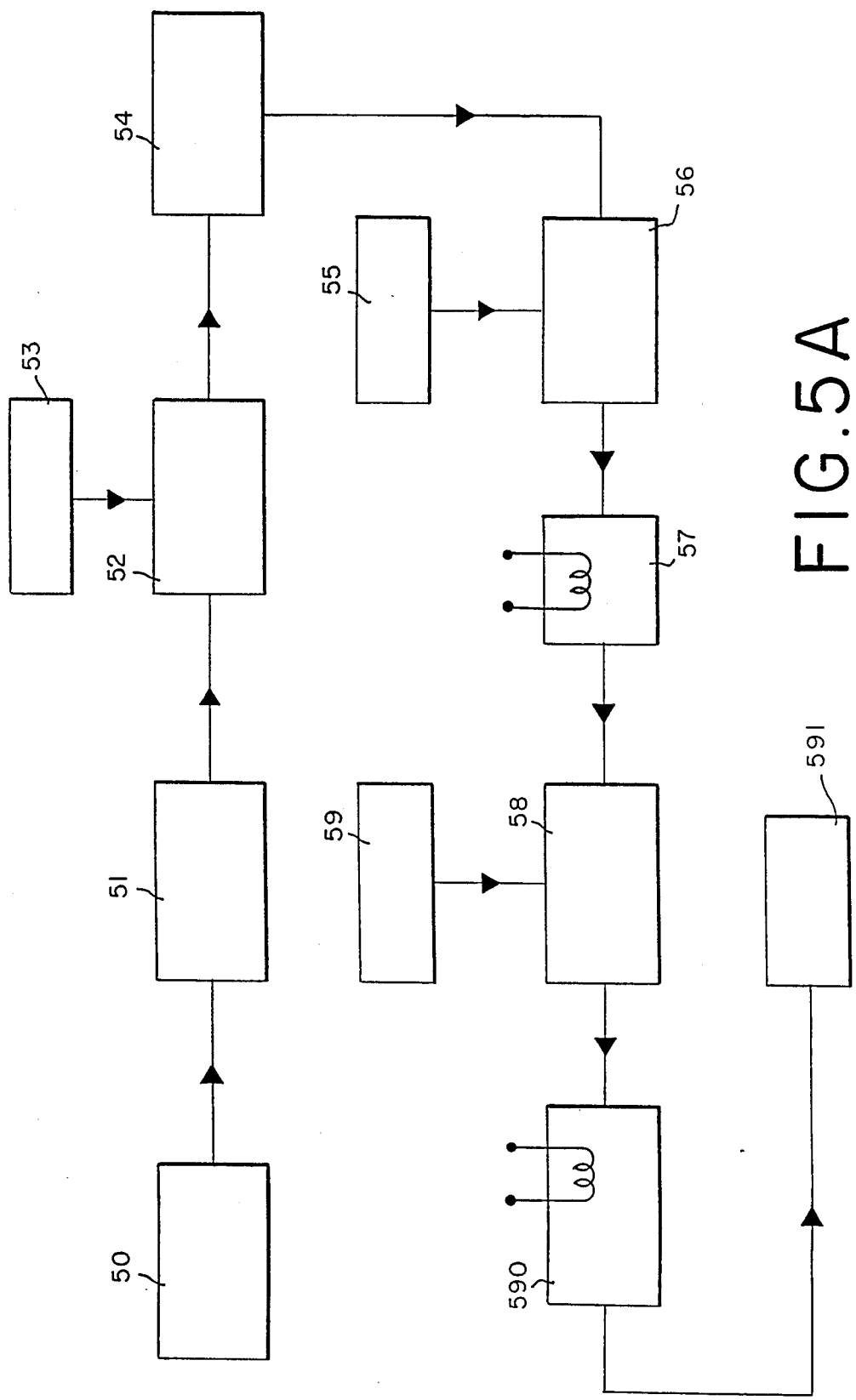

FIG.6
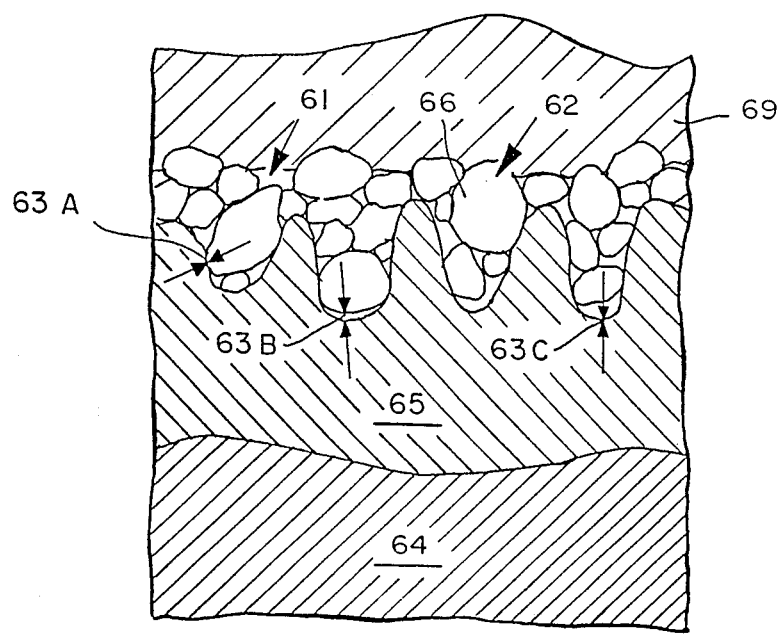
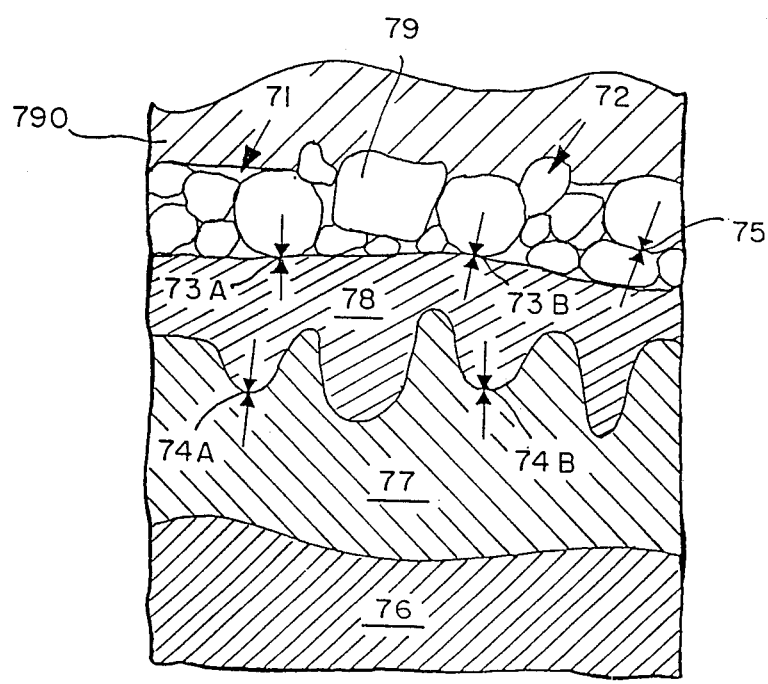
FIG.7

PROCESS FOR PREPARING A COATED FOOD PRODUCT

This application is a divisional of application for U.S. Pat. No. 114,697 filed on Oct. 29, 1987, now abandoned which is a continuation-in-part of application for U.S. Pat. No. 093,352 filed on Sept. 3, 1987, now abandoned.

BACKGROUND OF THE INVENTION

This invention relates to oil-impervious, flavor retaining and water-retaining food articles comprising a porous inner food structure and coated thereon at least one coating which may serve as a moisture and cooking oil barrier and flavor enhancer or replenisher as well as a breading or two coatings; one of which serves as a moisture and oil barrier (and, optionally, a flavor enhancer or replenisher) and the other of which serves as a breading (and, optionally, containing a flavor enhancer or replenisher) or three coatings, two of which serve as oil and water barrier layers (and, optionally, containing flavor enhancers and/or replenishers) and the third of which serves as a breading layer (optionally, containing the flavor enhancer or replenisher or flavor precursors).

The need for food articles, particularly macerated proteinaceous food articles such as hamburgers, chicken patties and turkey patties and macerated farinaceous food articles such as falafel balls and fried ground vegetable patties being produced in such a manner so that they do not lose a substantial amount of their original water and flavor values on cooking and so that they do not absorb or adsorb substantial amounts of oil on contact with cooking oil particularly during cooking and then on storage is well known in the food art.

Furthermore, the need for a breaded food article having such properties is also well known in the food art.

PCT International Patent Publication WO 87/03453 published on June 18, 1987 assigned to the Wisconsin Alumini Research Foundation entitled "Edible Film Barrier Resistant To Water Vapor Transfer" discloses an edible film for retarding water transfer among components of a multicomponent food product. The film disclosed includes base film having a hydrophilic polymer layer and a base film lipid layer. The base film lipid layer has a hydrophobic surface presented away from the hydrophilic polymer layer. An additional lipid layer is laminated to the hydrophobic surface of the base film lipid layer. Specifically disclosed are edible film barrier materials that can be used to stabilize water vapor pressure and moisture gradients existing between individual components of a multicomponent food product, e.g., unfrozen pizza and fruit pies.

Furthermore, U.S. Pat. No. 3,248,232 (Krijewski assigned to the Dow Chemical Company) entitled "Method of Coating Frozen Meat" describes a method of packaging frozen meat products for the purpose of shielding the meat while thawing against adulteration from extractable oleaginous additive materials leached from organic, thermoplastic, resinous packaging films enveloping the same. The Krijewski method comprises the steps of (i) freezing the meat product; (ii) applying a prime, edible, barrier coating composition composed essentially of an aqueous solution of an edible barrier material selected from the group of materials consisting of 9a) tapioca starch (b) corn starch (c) sodium oleate (d) sodium stearate (e) hydroxypropylmethylcellulose ether having an average methoxyl content within the range of from 27 to 29% and an average hydroxy propoxyl content within the range of from 4 to 7.5% (f) hydroxypropylmethylcellulose ether having an average methoxyl content within the range of from 19 to 24% and an average hydroxypropoxyl content within the range of 4 to 12% mixtures of (e) and (f), (g) pectinic acid amide having an average methoxyl content of from 3.5 to 5.0% (b) a sodium salt of carboxymethylcellulose having a degree of cellulose hydroxyl substitution of from 0.65 to 0.95 and a viscosity as a 2% aqueous solution at 20° C. of from 300 to 600 centipoises, as a thin continuous coating of from 3 to 10 mils covering the exposed surfaces of the frozen meat product, the barrier coating composition being solidifiable at the temperature of the surface of the frozen meat product at the time of application thereon; (iii) solidifying the continuous coating and (iv) enveloping the frozen barrier coated meat product in an outer casing of a packaging composition for frozen meat products consisting of a suitably adherent, moisture impervious, protective organic thermoplastic resinous packaging film having the principal film forming component thereof selected from the group consisting of ethylcellulose, polyethylene, polyvinyl chloride, SARAN ®, cellulose acetate, cellulose acetate butyrate and polypropylene.

U.S. Pat. No. 3,527,646 (Schieck, et al assigned to American Maize-Products Company entitled "METHOD OF COATING FOODS WITH PRE-GELATINIZED STARCH" relates to a method of coating foods with an edible amorphous film containing a pregelatinized starch as the essential ingredient. The process of U.S. Pat. No. 3,527,646 includes the steps of: (1) providing a small quantity of moisture on the surface of the food to be coated if dry starch powder will not adhere thereto; (2) applying a dry powder containing one or more pregelatinized starch materials as a major ingredient to the premoistened surface of the food; (3) moistening the layer of powder applied to the food in a limited manner to form a continuous colloidal suspension on the food surface, and (4) drying the suspension of powder to form an amorphous flexible film on the surface of the food to provide the coating. It is stated therein that the pregelatinized starch may be formed from a modified starch, a starch derivative or a high amylose starch derivative.

Indeed, the entire prior art concerning batter and breading is summarized (up to 1983) in the publication entitled "Batter and Breading" edited by Darrel R. Suderman and Frank E. Cunningham and published by the AVI Publishing Company, Inc. of Westport, Connecticut in 1983.

Publications on substituted cellulose derivatives including alkoxy cellulose derivatives, hydroxy alkoxy cellulose derivatives and acyloxy cellulose derivatives including those having the structures:

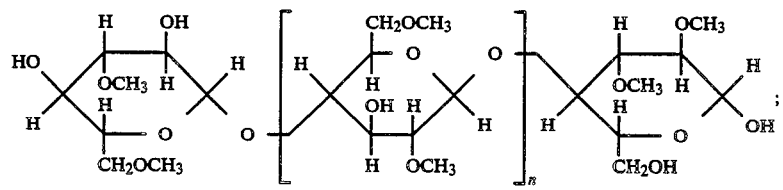

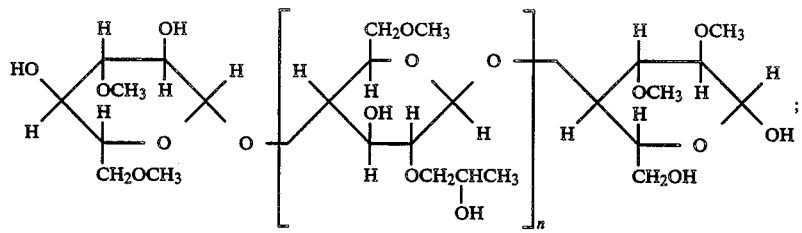

and

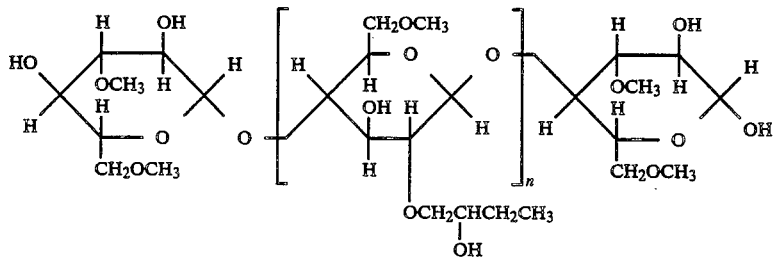

including the publication by Dow Chemical Company of Midland, Michigan entitled "METHOCEL ®/-Product Information" indicates that such products because they are insoluble in oil "reduce oil absorption" for potato products and "reduce oil absorption" and "maintain moist texture" for batters including breadings (reference: Dow Chemical Publication entitled "METHOCEL ®Food Gums" published in 1980 by the Dow Chemical Company). In addition, the Dow Publication entitled "METHOCEL" publication 192-608-78 indicates benefits for METHOCEL ® for "fried foods" including batters and potato products at page 4 thereof, thusly:

| Food Products | Premium METHOCEL Product | % Typical Use Levels |
|---|---|---|
| Fried Foods Batters | A4 M A 15-L-V | 0.3–0.8 |
| Potato products French fries | A4 M | 1% solution as dipping solution |
| Extruded fries | K100-LV | 0.3–0.5 |

Indeed, a recipe for a "No-Egg Batter", at page 5 of the 1980 Methocel Gum Publication is set forth as follows:

| Ingredients | Percent by Weight |
|---|---|
| Flour | 25.0 |
| Baking Powder | 0.7 |
| Salt | 0.7 |
| METHOCEL (2% solution) F50-LV Premium or K 100-LV Premium | 11.0 |
| Milk | 51.6 |
| Vegetable Oil | 11.0 |

By the same token, a publication of the "Kelco Company" used as an aid in marketing Kelco KELZAN-®Industrial Grade Xanthan Gum having the structure:

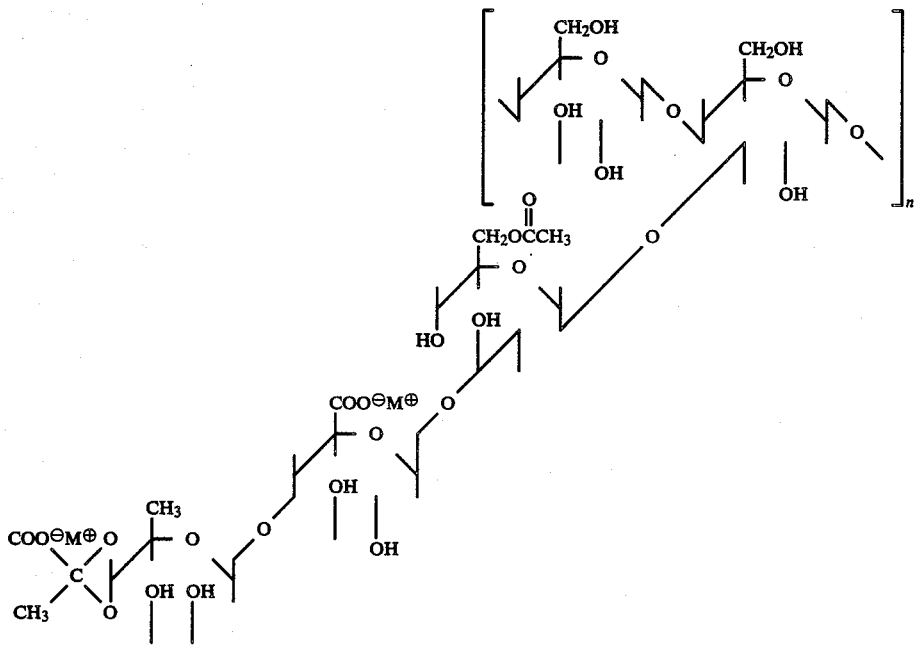

wherein M is an alkali metal such as sodium, potassium or an alkali earth metal such as calcium states that such products have a use "for the scientific control of water in many of the prepared foods we eat and drink as well any multitude of industrial processes and products".

A gelled food product which can be formed of meat or fish in chopped or granulate form is shown in Trilling, et al, U.S. Pat. No. 4,436,759. Binders are mentioned in U.S. Pat. No. 4,436,759 including starches and cellulosic materials. However, the binder is incorporated throughout the chopped food product in order to bind the product together.

A matrix formed of cellulose which has embedded therein fluid material is shown in Cilek, et al, U.S. Pat. No. 4,163,703.

Nakatsuka, et al, U.S. Pat. No. 4,076,846 discloses a composition which can contain starch and a cellulose material as well as a protein material, water and a lubricant (column 3, lines 60–63) which is used as a film or packaging material for various food products. Typically, the moldable and extrudable edible material is used for the packaging of various food and drug items that are intended to be introduced into cold or hot water without being unwrapped. There is no disclosure in U.S. Pat. No. 4,076,846 of coating a fish or meat product for the purpose of sealing in moisture or to seal out oil during the frying or heating step.

Frito-Lay, Inc., European patent application 222,601 corresponding to U.S. application Pat. Ser. No. 796,213 filed on Nov. 8, 1985, now U.S. Pat. No. 4,670,272, discloses a thermostable edible creme composition comprising a colloidal dispersion containing 50–90 weight percent corn syrup, 2–6 weight percent modified starch selected from pre-gelatinized and non-gelatinized starches, 0.5–4 weight percent hydrocolloid and 0.1–5 weight percent albumin with a water activity of the composition being 0.7 or less. The method for producing the thermostable edible creme composition is claimed therein comprising dispersing a hydrocolloid in corn syrup to form a colloidal dispersion, dispersing a modified starch and albumin in the dispersion, aerating the disperation and cooking it.

The corn syrup in European application 222,601 has a D.E. value of 24–70. It is indicated therein that, preferably, the syrup is a high fructose corn syrup. The preferable hydrocolloids listed are carrageenan, guar gum, alginate, xanthan gum, methylcellulose and carboxymethylcellulose. It is further indicated therein that preferred starches are modified non-gelatinized cold water hydratable starches and non-gelatinized starches having a Brabender viscosity of 100–500 Brabender units at 95° C. With respect to uses of the products of European application 222,601 it is indicated that the composition may be used as a filling material in a shelf-stable, comestible product such as layered pastry having alterating layers of pastry and filling. It is further indicated that since the composition has low water activity, only small amounts of water migrate out of the composition. It is further indicated that when used as a filling material, the pastry becomes less soggy and that the composition is thermostable at baking temperatures and may be added to the dough prior to baking and that the composition has a creamy texture and a long shelf life.

Nothing in the prior art implicitly or explicitly, however, discloses the oil impervious, water retaining and flavor retaining food article having a porous inner food structure and one or more barrier/breading coatings thereon of our invention or processes for preparing same or apparatus for carrying out such processes.

BRIEF DESCRIPTION OF THE DRAWINGS

FIG. 3 is a cut-away side elevation view of another embodiment of a food article of our invention wherein the inner food structure is first coated with a barrier layer and then coated with a breading layer.

FIG. 4A is a cut-away side elevation view of another embodiment of a food article of our invention where the barrier substance and the porous inner food structure are combined and the porous inner food structure/barrier composition is coated with a breading.

FIG. 5A is a block flow diagram setting forth in schematic form a process of our invention for preparing the food article of our invention, the steps including optional frying steps.

FIG. 6 is a cross-section schematic diagram of a theoretical model of physical adhesion of barrier layer and breading to poultry skin; representing a blow-up of a cross sectional area of a food article of our invention (a modification of figure 4.6 on page 38 of the book: "BATTER AND BREADING", edited by Darrel R. Suderman and Frank E. Cunningham and published by the AVI Publishing Company of Westport, Connecticut).

FIG. 7 is a schematic cut-away cross section view of a theoretical model of physical adhesion of barrier layer and breading to poultry skin with cuticle and is a modification of figure 4.7 set forth on page 38 of the book "BATTER AND BREADING" edited by Darrel R. Suderman and Frank E. Cunningham and published by AVI Publishing Company, Inc.

FIG. 13A is the line layout of the apparatus of FIG. 13.

FIG. 13B is the isometric layout of the apparatus of FIG. 13.

FIG. 14A is the line layout of the apparatus of FIG. 14.

FIG. 14B is the isometric layout of the apparatus of FIG. 14.

SUMMARY OF THE INVENTION

Figure 1:
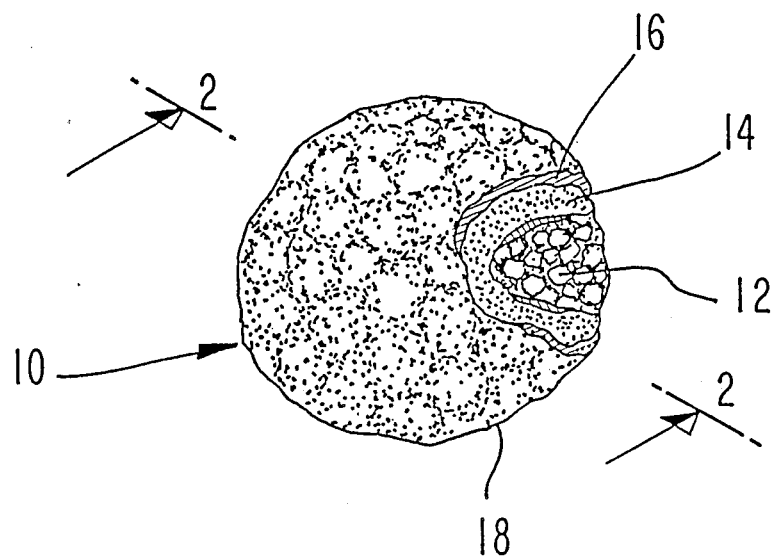
FIG. 1 is a partial cut-away perspective view of a food article of our invention wherein the porous inner food structure is first coated with a breading and the breading surface is coated with a barrier layer.

Our invention covers oil-impervious, flavor retaining, flavor-enhancing, flavor replenishing and water-retaining food articles, a process for preparing same and apparatus for carrying out the process.

More specifically, our invention covers food articles of manufacture which may be shaped food articles or pre-cut food articles including a breading and barrier layer or coating (at least one) whereby the food article is rendered essentially oil impervious on contact with a cooking oil and whereby retention of a substantial quantity of water and flavor originally contained in the food structure occurs.

More specifically, our invention covers a food article of manufacture having:

(1) a porous inner food structure, comprising water and a proteinaceous and/or a farinaceous foodstuff and, optionally, one or more flavor compositions, flavor precursors and/or flavor enhancers $F_0$ compatible with all flavor compositions, flavor precursors and/or flavor enhancers hereinafter denoted as $F_1$, $F_2$, $F_3$, $R_4$, $F_5$ and $F_6$ present in the article;

(2) a first outer surface contiguous with an integral part of said porous inner food structure; and (3) fixedly coated on the entirety of said first outer surface, in the alternative:

(i) a first breading/barrier coating having a second outer surface comprising an intimate admixture of flour, a starch polysaccharide, a substituted cellulose selected from the group consisting of lower alkoxy celluloses, hydroxy lower alkoxy celluloses and acyloxy celluloses, and a gum and, optionally, one or more flavoring compositions, flavor precursors and/or flavor enhancers referred herein to as $F_1$ compatible with the flavor compositions and/or flavorings produced from the flavor precursors and/or flavor enhancers of the porous inner food structure and any other flavors $F_2$, $F_3$, $F_4$, $F_5$ and/or $F_6$ present at any other locations of the food article; or (ii) a breading coating having a third outer surface comprising flour and, optionally, one or more flavor precursors, flavoring compositions and/or flavor enhancers referred to herein as $F_2$, compatible with the flavor compositions, flavors produced from flavor precursors and/or flavor enhancers $F_0$ of the porous inner food structure and any other flavor compositions, flavor enhancers and/or flavor compositions produced from flavor precursors $F_1$, $F_3$, $F_4$, $F_5$ and/or $F_6$, present at any other locations of the food article; or (iii) a first barrier coating having a fourth outer surface comprising an intimate admixture of a starch polysaccharide, a substituted cellulose selected from the group consisting of lower alkoxy celluloses, hydroxy lower alkoxy celluloses and acyloxy celluloses, and a gum; and, optionally, one or more flavor precursors, one or more flavoring compositions and/or one or more flavor enhancers referred to herein as $F_3$ compatible with flavoring compositions, flavoring compositions produced from flavor precursors and/or flavor enhancers $F_0$ of the porous inner food structure and any other flavor compositions, flavor enhancers and/or flavor compositions produced from flavor precursors $F_1$, $F_2$, $F_4$, $F_5$ and $F_6$, present at any other locations of the food article; or (iv) a second breading/barrier coating having a fifth outer surface comprising an intimate admixture of (a) a proteinaceous foodstuff containing a fat and/or edible polyol polyester, (b) a starch polysaccharide, (c) a substituted cellulose selected from the group consisting of lower alkoxy celluloses, hydroxy lower alkoxy celluloses and acyloxy celluloses and (d) a gum; and (e) optionally, one or more flavoring compositions, flavor precursors and/or flavor enhancers referred to herein as $F_4$, compatible with flavoring compositions, flavor enhancers and/or flavor compositions produced from flavor precursors $F_0$ of the porous inner food structure and any other flavor compositions, flavor enhancers and/or flavor compositions produced from flavor precursors $F_1$, $F_2$, $F_3$, $F_5$ and/or $F_6$, present at any other locations of the food article; and (4) fixedly coated on the entirety of said second outer surface and/or said third outer surface, a second barrier coating comprising an intimate admixture of a starch polysaccharide, a substituted cellulose selected from the group consisting of lower alkoxy celluloses, hydroxy lower alkoxy celluloses and acyloxy celluloses and a gum, and, optionally, one or more flavor compositions, flavor precursors and/or flavor enhancers $F_5$ compatible with all of the flavor compositions, flavor compositions produced from the flavor precursors, and/or flavor enhancers $F_1$, $F_2$, $F_3$, $F_4$ and $F_6$ and $F_0$ if present in the article; or fixedly coated on the entirety of said fourth outer surface, a breading coating having a sixth outer surface comprising flour and, optionally, one or more flavor compositions, flavor precursors and/or flavor enhancers $F_6$ compatible with any or all of the flavor compositions, flavor compositions produced from flavor precursors and/or flavor enhancers $F_1$, $F_2$, $F_3$, $F_4$, $F_5$ and $F_0$ if present in the article, with the proviso that at least an efficaceous quantity of at least one of $F_0$, $F_1$, $F_2$, $F_3$, $F_4$, $F_5$ and/or $F_6$ is initially present in said article, said food article having the properties of:

(x) retention of a substantial quantity of the water originally contained in said porous inner food structure on storage and/or on cooking;

(y) substantial imperviousness to the absorption or adsorption of cooking oil into said porous inner food structure when said food article is contacted with cooking oil on storage and/or on cooking; and (z) retention of the original flavor properties of the porous inner food structure on storage and/or on cooking.

The foregoing food article includes but is not limited to food articles shown in FIGS. 1, 2, 3, 4A, 4B, 4C, 4D, 4E, 6 and 7 described in detail, infra.

Thus, the food article of our invention as shown in FIG. 1 can be a shaped flavored proteinaceous food article of manufacture having (i) an outer surface and (ii) a porous inner structure which comprises a protein containing material and, optionally, a flavor enhancer and/or flavor composition and/or flavor precursors capable of forming a flavor composition compatible with the original flavor of the protein containing material; and coated on the outer surface of the protein containing material a breading coating having a breading coating surface and comprising flour and, optionally, a flavor or flavor enhancer or flavor precursor capable of forming a flavor compatible with the flavor of the porous inner structure; and coated on the breading coating surface a second coating composition which is a barrier layer and which is substantially impermeable to water which would ordinarily diffuse outward from the food article and cooking oil which would diffuse inward when the food article is immersed in cooking oil at temperatures in the range of up to about 400° F.; with the barrier layer comprising a a starch polysaccharide in intimate admixture with a substituted cellulose selected from the group consisting of lower alkoxy celluloses, hydroxy lower alkoxy celluloses and acyloxy celluloses and a gum such as guar gum or xanthan gum.

The proteinaceous material can be of course substituted with a farinaceous material or the porous inner structure can be a mixture of proteinaceous and farinaceous materials such as a mixture of ground onion and ground chickpeas. Indeed, the inner porous structure need not be macerated bu instead can be a material such as chicken meat or beef as illustrated in FIGS. 6 and 7. Furthermore, the porous inner structure may be a potato slice or an onion slice or slices of onion and beef adherent to one another, for example.

Alternatively, the food article of our invention can have a first porous inner structure which comprises a protein containing material and/or a farinaceous material having an outer surface and, optionally, containing a flavor composition, and/or flavor enhancer and/or precursors for formation of a flavor composition when the article is cooked; and coated on the outer surface a barrier layer having a second outer surface comprising an intimate admixture of a starch polysaccharide, a substituted cellulose selected from the group consisting of lower alkoxy celluloses, hydroxy lower alkoxy celluloses and acyloxy celluloses and a gum such as xanthan gum or guar gum and, optionally, containing a flavor composition, and/or flavor enhancer and/or precursors for formation of a flavor composition when the article is cooked. Coated on the second outer layer of the barrier layer is a breading layer comprising flour and, optionally, containing a flavor composition, and/or flavor enhancer and/or precursors for formation of a flavor composition when the article is cooked and if desired, other breading ingredients, as set forth, infra.

In the alternative, the food article of manufacture of our invention (for example, that shown in FIG. 4A) can consist of a porous inner structure comprising a protein containing material and/or a farinaceous material intimately admixed with the "barrier" substance of our invention, to wit: A starch polysaccharide, a substituted cellulose selected from the group consisting of lower alkoxy celluloses, hydroxy lower alkoxy celluloses and acyloxy celluloses and a gum such as xanthan gum or guar gum and, optionally, containing a flavor composition, and/or flavor enhancer and/or precursors for formation of a flavor composition when the article is cooked. Coated on the outer surface of the porous inner food structure in substantial entirety is the breading layer containing flour and other optional ingredients, e.g., egg yolk and, optionally, containing a flavor composition, and/or flavor enhancer and/or precursors for formation of a flavor composition when the article is cooked.

Figure 4B:
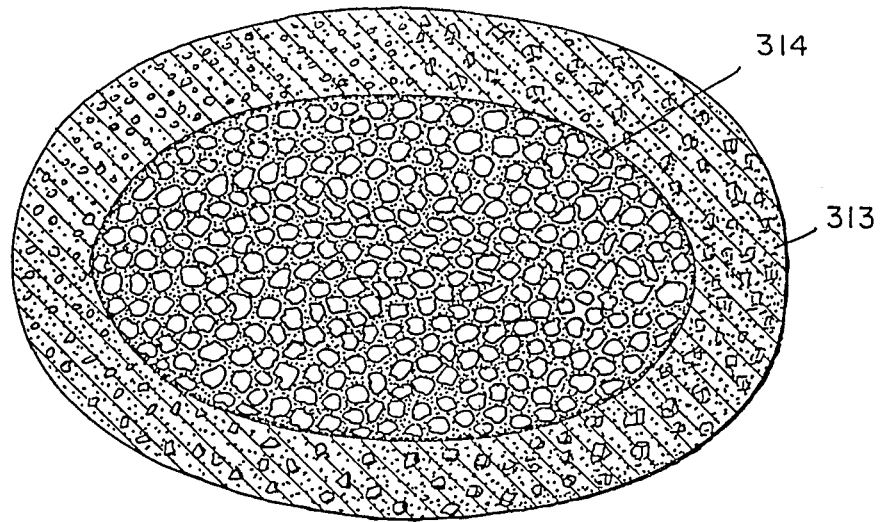
FIG. 4B is a cut-away side elevation view of another embodiment of a food article of our invention wherein the porous inner food structure may or may not be combined with the barrier composition and the inner food structure is then coated with a breading/barrier coating composition.

A variation of this food article is one as shown in FIG. 4B wherein the breading layer also contains barrier composition comprising a starch polysaccharide, a substituted cellulose selected from the group consisting of lower alkoxy celluloses, hydroxy lower alkoxy celluloses and acyloxy celluloses and a gum such as guar gum or xanthan gum or combinations thereof and, optionally, containing a flavor composition, and/or flavor enhancer and/or precursors for formation of a flavor composition when the article is cooked.

Figure 4C:
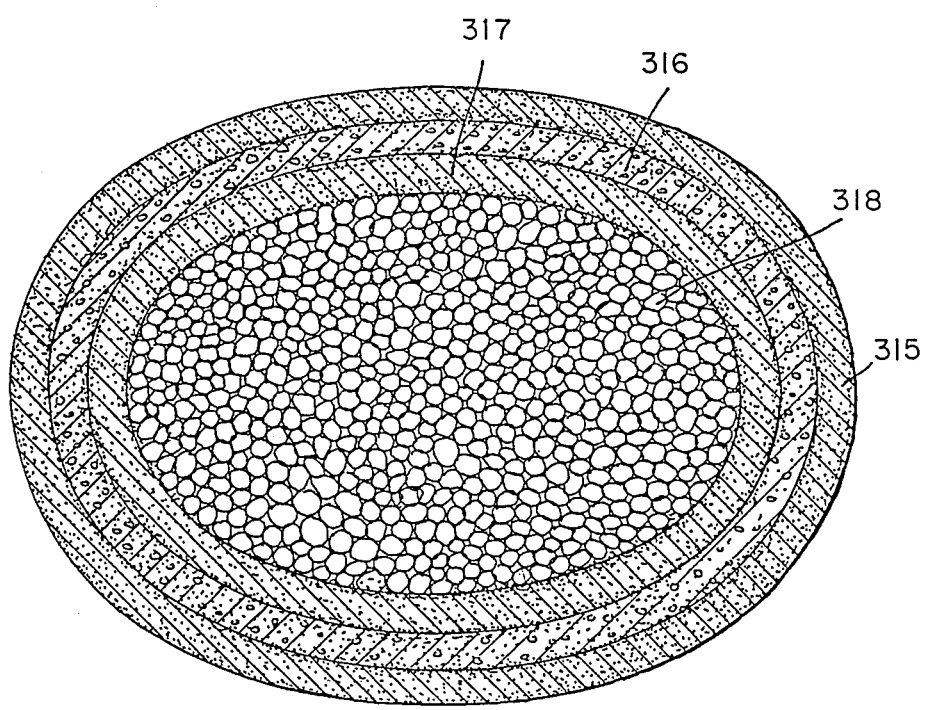
FIG. 4C is a cut-away side elevation view of another embodiment of a food article of our invention wherein the porous inner food structure is coated with a first barrier layer; the first barrier layer is coated with a breading layer; and the breading layer is coated with a second barrier layer.
Figure 4D:
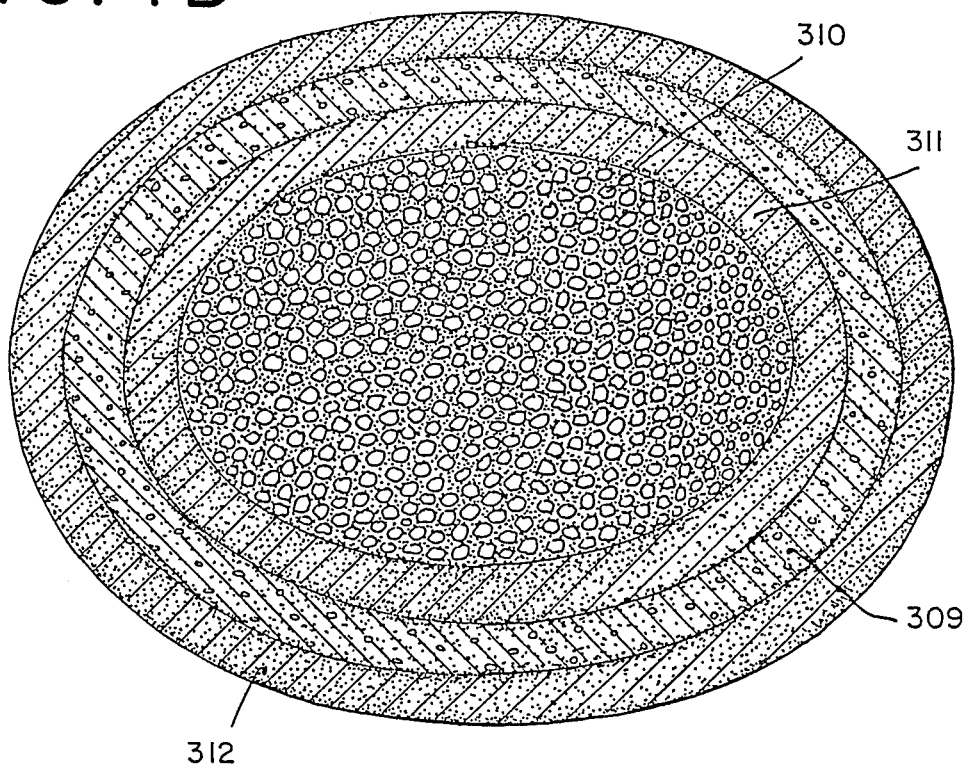
FIG. 4D is a cut-away side elevation view of another embodiment of the food article of our invention wherein the porous inner food structure is combined with a barrier composition; the porous inner food structure is coated with a barrier layer; the barrier layer is coated with a breading layer; and the breading layer is in turn coated with a second barrier layer.

In the alternative, the porous inner food structure as shown in FIG. 4C may be coated with a barrier composition comprising an intimate admixture of a starch polysaccharide, a substituted cellulose selected from the group consisting of lower alkoxy celluloses, hydroxy lower alkoxy celluloses and acyloxy celluloses and a gum such as guar gum or xanthan gum and, optionally, containing a flavor composition, and/or flavor enhancer and/or precursors for formation of a flavor composition when the article is cooked; which, in turn, is coated with a breading layer and, optionally, containing a flavor composition, and/or flavor enhancer and/or precursors for formation of a flavor composition when the article is cooked (which may or may not include barrier composition) which, in turn, is coated on its entire surface with an additional barrier layer also comprising a starch polysaccharide, a substituted cellulose selected from the group consisting of lower alkoxy celluloses, hydroxy lower alkoxy celluloses and acyloxy celluloses and, optionally, containing a flavor composition, and/or flavor enhancer and/or precursors for formation of a flavor composition when the article is cooked. The inner porous structure which may be proteinaceous and/or farinaceous may, if desired, also contain a barrier composition comprising a starch polysaccharide, a substituted cellulose selected from the group consisting of lower alkoxy celluloses, hydroxy lower alkoxy celluloses and acyloxy celluloses and a gum such as guar gum or xanthan gum and, optionally, containing a flavor composition, and/or flavor enhancer and/or precursors for formation of a flavor composition when the article is cooked. The embodiment of our invention wherein the three coatings surround the proteinaceous and/or farinaceous foodstuff containing barrier composition is shown in FIG. 4D.

Still another embodiment of our invention involves the coating of a porous inner food structure which may be farinaceous or proteinaceous or both with a mixture of (a) a proteinaceous foodstuff containing a fat and/or an edible polyolpolyester; (b) a starch polysaccharide; (c) a substituted cellulose selected from the group consisting of lower alkoxy celluloses, hydroxy lower alkoxy celluloses and acyloxy celluloses and(d) a gum such as xanthan gum or gum arabic (e) and, optionally, containing a flavor composition, and/or flavor enhancer and/or precursors for formation of a flavor composition when the article is cooked. On cooking, the outer proteinaceous/barrier layer having the above formulation also becomes a "breading" layer and has surprisingly been found to have the properties of:

(x) retention of a substantial quantity of the water originally contained in the porous inner proteinaceous food structure or porous inner farinaceous food structure on storage and/or on cooking;

(y) substantial imperviousness to the absorption or adsorption of cooking oil into the porous inner food structure when the food article is contacted with cooking oil on storage and/or in cooking; and (z) retention of the original flavor properties of the porous inner food structure on storage and/or on cooking.

The gum used in the barrier coating may be xanthan gum, carrageenan gum, gum tragacanth, karaya gum, guar gum, locust bean gum or the like. The xanthan gum has the structure:

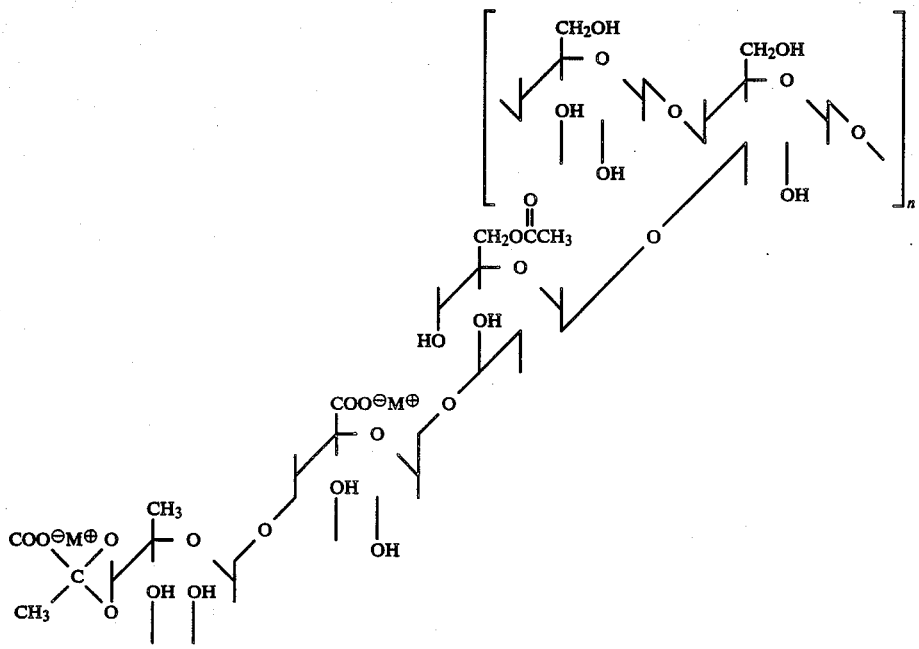

wherein n is indicative of repeating units and M represents sodium, potassium and/or ½ calcium (the calcium ion being attracted to two repeating monomeric units as indicated above). Examples of xanthan gum are the KELTROL®brand of xanthan gums, e.g., KELTROL®F produced by the Kelco Organization of Okmulgee, Oklahoma. The place of the aforementioned gum such as xanthan gum or in addition to the aforementioned gums such as xanthan gum, microcrystalline cellulose and Furcellaran may be utilized.

The cellulose derivative in the barrier layer or in the barrier composition may be an alkoxy cellulose such as methylcellulose having the structure:

for example METHOCEL®A produced by the Dow Chemical Company of Midland, Michigan) wherein n represents a repeating monomeric unit; hydroxypropylcellulose having the structure:

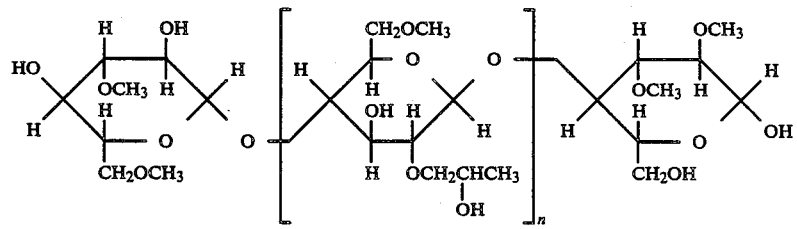

wherein n represents a repeating monomeric unit, for example, METHOCEL®E, METHOCEL®F, METHOCEL®J or METHOCEL®K produced by the Dow Chemical Company of Midland, Michigan or KLUCEL® produced by the Hercules Corporation of Wilmington, Delaware; or hydroxybutylmethylcellulose having the structure:

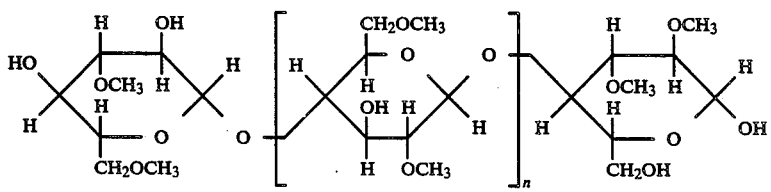

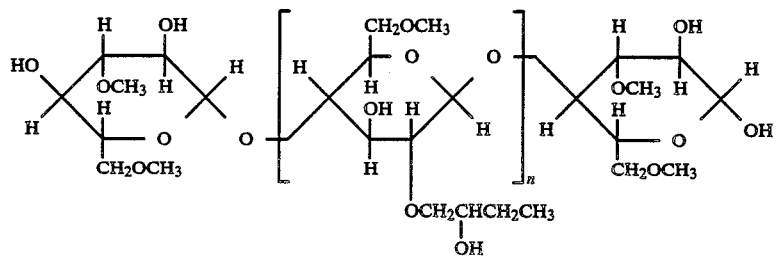

for example, METHOCEL®HB produced by the Dow Chemical Company of Midland, Michigan (wherein n represents a repeating monomeric unit). The number "n" in the foregoing cellulose derivatives' structures is a function of the particular viscosity (and thus, molecular weight) of the polymer used. The range of viscosity in centipoises may vary from about 10 up to about 100,000 and even higher. Other cellulose derivatives that may be used are acyloxy celluloses such as carboxymethylcellulose. The substances "hydroxypropylmethylcellulose" and "hydroxybutylmethylcellulose" are herein also termed "hydroxy lower alkyl celluloses".

The starch derivatives that can be used in the barrier layer may be modified or non-modified starches. More specifically, starch products can be used which contain a large amount, e.g., 50% more of so-called amylose having a linear configuration, such as high-amylose corn starch, fractionated amylose or the like. A starch containing higher percentages of amylose is useable in the barrier layer of our invention, unlike the starches used in U.S. Pat. No. 4,076,846, for example. However, the starch materials found to be useable in said patent 4,076,846 are also useable in our invention. These starch materials generally include various common type starches obtained from grain, potatoes, edible roots, etc. such as corn starch, wheat starch, potato starch, tapioca starch and the like which generally contain 50% by weight or less of amylose. Special type starches are also useable in the practice of our invention which contain 10% or less of amylose such as waxy corn starch and glutinous rice starch used further in combination with high amylose starches. Furthermore, so-called unmodified treated starches such as alpha-starch and dextrin may also be used. High amylose starches containing more than 50% by weight of amylose are generally special corn starch materials derived from an improved corn variety. The high amylose starch can be replaced by a so-called fractionated amylose containing 90% by weight or more of amylose which is obtained from common-type starches such as potato starch by fractionation or replaced by a mixture of fractionated amylose and other common-type starches. In addition, edible modified starch materials can be used in our invention including carboxymethyl starch, hydroxyethyl starch, hydroxypropyl starch, methyl starch, ethyl starch, methylhydroxyethyl starch, ethylhydroxypropyl starch, starch phosphate and the like.

Other starch products include instant thickened starch produced from pre-gelled starch/maltodextrin products as disclosed in the July 1987 issue of "Food Processing" on page 68, for example, INSTA STARCH® manufactured by Zumbro Incorporated, Route 1, Box 83, Hayfield, Minnesota 55940.

As stated, supra, one of the embodiments of our invention may include a polyolpolyester. Such materials are polyol fatty acid polyesters such as sucrose polyesters as described in U.S. Pat. No. 3,600,186 issued on Aug. 17, 1971; U.S. Pat. No. 3,954,976 issued on May 4, 1976; U.S. Pat. No. 4,241,054 issued on Dec. 23, 1980; U.S. Pat. No. 4,264,583 issued on Apr. 28, 1981; and European application 132,941 published on Feb. 13, 1985 the specifications for which are incorporated by reference herein. Thus, European application 132,941 describes the synthesis of higher polyol fatty acid polyesters using carbonate catalysts and includes the disclosure of sucrose fatty acid polyesters.

The gum used in the barrier layer or barrier composition of our invention can also be prepared according to state of the art methods such as that described in European Patent application 207,032 published on Dec. 30, 1986 and abstracted at Chemical Abstracts, Volume 107, 1987, at No. 38351f. The disclosure of published European application 207,032 is incorporated herein by reference. The teachings of this application giving rise to a guar gum flour can easily be incorporated into our invention and the guar gum flour thus produced according to the teachings of application 207,032 can be used as one of the "gums" of our invention in the barrier layer of our invention. European application 207,032 relates to a process for preparing a product comprising guar gum present in the form of particles and possessing a sustained swelling in an aqueous suspension whereby guar gum flour is produced with a solution consisting of water:solvent in the relationship of 60:40 up to 0:100 and comprising a compound of the group consisting of film forming fatty acids, film forming polymers and ethylcellulose whereby the solvent is an organic solvent having the ability in dissolving the organic film forming compounds while creating particle or glomerates having a size of less than 3 mm but substantially above 0.5 mm. The guar gum flour is wetted with 28.5 kg water-/isopropenyl azeotropic mixture (12:88) in which 0.18 kilograms ethylcelluloses dissolved. The guar flour is moisturized in a wet mixture, then fluidized bed-dried to less than 8% water and the fraction of desired particle size (0.5–3.0 mm) is sieved off.

The barrier layer or barrier composition of our invention can also contain alginates such as those alginates containing alpha-1,4 linked L—guluronic acid units having the structure:

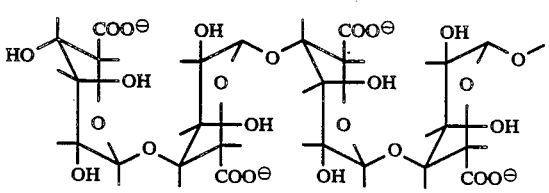

beta-1,4 linked D—mannuronic acid units having the structure:

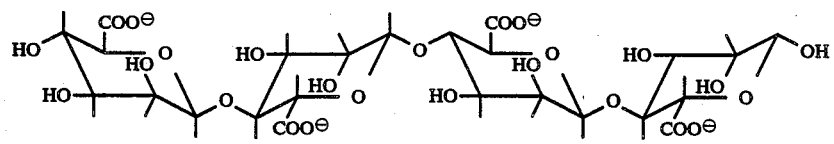

and alpha-1,4 linked S—galacturonic acid units having the structure:

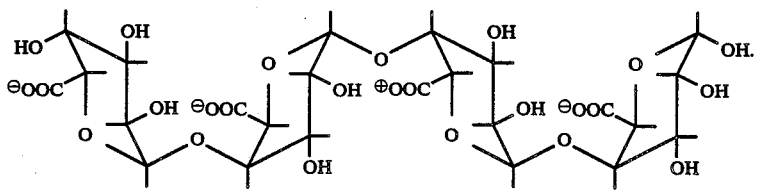

Such alginates may also be present in the form of calcium-algin complexes as described by Messina and Pate in "Food Enginnering", April 1966, in the article entitled "Ingredient Cuts Heat Process Time/La Choy Foods' Algin Thickening System Keeps Product Consistency Low For Efficient Retorting, Permits Viscosity Increase After Processing". Sodium alginate, per se, or potassium alginate can also be used in the barrier coating and/or barrier composition of our invention.

The barrier layer and/or barrier compositions of our invention can also contain proteinaceous substances such as milk proteins including alpha, beta and gamma cascins, and sodium and potassium cascinate.

In addition to the foregoing ingredients, the barrier layer or barrier composition of our invention may also contain salts and other flavoring materials to improve the overall flavor of the food article of manufacture of our invention.

Thus, salts such as sodium chloride and salt compositions such as those set forth in U.S. Pat. No. 4,514,431 issued on Apr. 30, 1985 comprising:

(a) from about 0.25 up to about 0.80 mole percent of lactic acid and/or a lactate salt;
(b) from 0 up to about 0.09 percent on a dry basis of glycolic acid or a glycolate salt;
(c) from 0 up to about 10.0 mole percent on a dry basis of a magnesium salt;
(d) from about 6 mole percent up to about 50 mole percent on a dry basis of a phosphate and/or a monoacid phosphate and/or a diacid phosphate and/or phosphoric acid taken alone or taken further together with at least one tripolyphosphate; pyrophosphate or polymetaphosphate;
(e) from 0 mole percent up to about 40 mole percent on a dry basis of a sodium salt;
(f) from about 8 mole percent up to about 50 mole percent on a dry basis of a potassium salt;
(g) from about 0.3 mole percent up to about 16 mole percent on a dry basis of a chloride;
(h) from 0 mole percent up to about 30 mole percent on a dry basis of a carbonate and/or a bicarbonate and/or carbonic acid;
(j) from 0 mole percent up to about 2.0 mole percent on a dry basis of a monobasic glutamate and/or a dibasic glutamate and/or glutamic acid; and
(k) from 0 up to about 0.6 mole percent on a dry basis of a calcium salt may be utilized. The disclosure of U.S. Pat. No. 4,514,431 is incorporated herein by reference.

By the same token, salts as set forth in U.S. Pat. No. 4,258,072 issued on Mar. 24, 1981; U.S. Pat. No. 4,216,244 issued on Aug. 5, 1980; U.S. Pat. No. 4,216,244; U.S. Pat. No. 4,066,793 issued on Jan. 3, 1978 all include salt compositions useful in the practice of our invention. Furthermore, Yamada, German Offenlegungsschrift No. 3 144 166; French Patent No. 2493681 and Japan Published Application J57/079860 disclose seasoning compositions which are useful in the practice of our invention and which may be either:

| (i) | 15–21 | weight percent magnesium chloride; |
| | 3–10 | weight percent magnesium sulfate; |
| | 2–4 | weight percent potassium chloride; |
| | 0.2–0.5 | weight percent magnesium bromide; and |
| | 2–7 | weight percent sodium chloride; or |
| (ii) | 15–21 | weight percent magnesium chloride; |
| | 6–9 | weight percent magnesium sulfate; |
| | 2–4 | weight percent potassium chloride; |
| | 0.2–0.4 | weight percent magnesium bromide; |
| | 2–6 | weight percent sodium chloride; and |
| | 0.1–21 | weight percent calcium salt. |

Furthermore, other salts as disclosed in Japan Patent J81/022311 which discloses a synergistic "seasoning" composition containing monosodium glutamate, a nucleic acid type tasting compound, sodium chloride, succinic acid salt and at least one other sodium salt. The "seasoning" is composed of:

(i) monosodium glutamate;
(ii) nucleic acid-type tasting substance such as disodium inosine-5'-monophosphate and/or disodium guanosine-5'-monophosphate;
(iii) sodium chloride;
(iv) succinic acid and/or sodium succinate; and
(v) at least one salt selected from the group consisting of monosodium furmarate, trisodium citrate, monosodium lactate, calcium lactate, disodium malate, disodium tartarate, sodium ascorbate and monosodium aspartate may also be used in the practice of our invention.

Other salts which may be used are disclosed in Japan Published Application J82/022311; U.S. Pat. No. 3,821,368; Japan Patent J82/00777 issued on Jan. 7, 1982 and U.S. Pat. No. 4,332,823 and U.S. Pat. No. 4,340,614 issued on July 20, 1982 the disclosures of which are all incorporated by reference herein.

Flavor materials which are useful in the practice of our invention which may be included in the barrier layer or barrier composition and/or any other parts of the article of our invention are those, for example, which are disclosed in U.S. Pat. No. 4,311,720 issued on Jan. 19, 1982 (incorporated by reference herein) as well as the poultry flavor compositions disclosed in U.S. Pat. No. 3,394,017 issued on July 23, 1968 (incorporated by reference herein) and the meat flavor compositions disclosed in U.S. Pat. No. 3,394,015 issued on July 23, 1968 the specification of which is incorporated by reference herein. Thus, particularly useful in the practice of our invention is a product produced according to a process comprising or reacting a mixture consisting essentially of protein hydrolysate and a sulfur containing compound selected from the group consisting of a sulfur containing amino acid, a lower alkyl mercaptan, a lower alkyl sulfide, a lower alkyl disulfide, hydrogen sulfide and an inorganic sulfur compound such as sodium sulfide or sodium sulfhydrate. Organic sulfur compounds useful in the production of such flavor are cysteine, cystine or methionine, for example.

Other flavor substances useful in the practice of our invention are set forth in the following patents which are incorporated by reference herein:
U.S. Pat. No. 4,076,852 issued on Feb. 28, 1978.
U.S. Pat. No. 4,081,565 issued on Mar. 28, 1978.
U.S. Pat. No. 4,594,254 issued on June 10, 1986.
U.S. Pat. No. 4,663,476 issued on May 5, 1987.
U.S. Pat. No. 4,631,194 issued on Dec. 23, 1986.
U.S. Pat. No. 4,515,967 issued on May 7, 1985.
U.S. Pat. No. 3,684,809 issued on Aug. 15, 1972.
U.S. Pat. No. 3,686,177 issued on Aug. 22, 1972.

Flavor precursor compositions useful in the practice of our invention are compositions such as those exemplified (prior to producing the actual flavor) in U.S. Pat. No. 4,081,565 issued on Mar. 28,1978 and U.S. Pat. No. 4,076,852 issued on Feb. 28, 1978 the specifications for which are incorporated by reference herein. Thus, the flavor precursors may be:
(i) a meat enzymatic digests;
(ii) a sulfur compound such as cysteine or torene;
(iii) thiamine and/or a thiazol alkanol;
(iv) other free amino acids and/or polypeptides; and
(v) a monosaccharide and/or a disaccharide such as sucrose and/or a polysaccharide.

In addition, other flavor precursor compositions can be used, for example, flavor precursor compositions set forth in U.S. Pat. No. 3,394,017 (thiamine and a mixture of amino acids); U.S. Pat. No. 3,519,437 (thiamine and 2-aminoethane sulfonic acid); U.S. Pat. No. 3,532,514 (cysteine sugar and a fatty acid material); U.S. Pat. No. 3,645,753 (enzymatic digest of meat extract, hydrolyzed vegetable protein and yeast autolysate; U.S. Pat. No. 3,394,015 (sulfur-containing compound such as cysteine and hydrolyzed vegetable protein) (sugar free); U.S. Pat. No. 3,394,016 (thiamine and an aliphatic carboxylic acid); German Offenlegungsschrift 1932800 (hydrogen sulfide and a 4-hydroxy-2,3-dihydrofuran-3-one; U.S. Pat. No. 2,918,376 (a fish protein hydrolyzate and cysteine); U.S. Pat. No. 2,887,387 (a fish protein hydrolyzate and a saccharide). All of the aforementioned patents and Offenlegungsschrift are herewith incorporated by reference herein.

Flavor enhancers which may be used in conjunction with the aforementioned flavor materials and/or flavor precursor materials are, for example, tetraalkyl pyrazines, for example, 2,3,5,6-tetramethyl pyrazine.

In addition, other carbohydrates may be used in the composition for the barrier layer(s) and/or barrier compositions of our invention such as dextrose monohydrate (for example, CERELOSE®2001.

With respect to the barrier layer and/or barrier composition of our invention the weight ratios of starch:gum:cellulose derivative may vary from about 8 (starch:1(gum):10 (cellulose derivative) up to about 200 (starch:1(gum):20 (cellulose derivative).

The concentration of salt or salt composition in the barrier film and/or barrier composition of our invention may vary from about 0.1% by weight up to about 10% by weight of the composition.

The concentration of cellulose derivative in the barrier layer and/or barrier composition of our invention may vary from about 5% by weight of the composition up to about 70% of the composition.

The concentration of gum in the barrier layer and/or barrier composition of our invention may vary from about 0.1% up to about 4% by weight of the composition.

The concentration of starch in the barrier coating and/or barrier composition of our invention may vary from about 20% up to about 85% by weight of the composition.

When desired, the concentration of carbohydrates such as dextrose monohydrate in the barrier coating and/or barrier composition of our invention may vary from about 0 up to about 1% by weight of the composition.

When it is desired to be used the alginate, e.g., sodium alginate concentration in the barrier layer and/or barrier composition of our invention may vary from about 0 up to about 15% by weight of the composition.

When desired, the casein derivative, e.g., sodium caseinate concentration in the barrier layer and/or barrier composition of our invention may vary from about 0 up to about 25% by weight of the composition.

The breading/batter layer used in the practice of our invention (as illustrated in the embodiments of FIGS. 1, 2, 3, 4A, 4B, 4C, 4D, 6 and 7 all contain flour and may, if desired, contain other standard breading/batter ingredients, to wit:
salts;
carbohydrates; and
eggs.

The flour ingredients may be, for example, wheat flour, bleached or not bleached; corn flour and the like.

The salt ingredients may be sodium chloride, monosodium glutamate, or any salt such as those set forth in U.S. Pat. No. 4,514,431 issued on Apr. 30, 1985 comprising:
(a) from about 0.25 up to about 0.80 mole percent of lactic acid and/or a lactate salt;
(b) from 0 up to about 0.09 percent on a dry basis of glycolic acid or a glycolate salt;
(c) from 0 up to about 10.0 mole percent on a dry basis of a magnesium salt;
(d) from about 6 mole percent up to about 50 mole percent on a dry basis of a phosphate and/or a monoacid phosphate and/or a diacid phosphate and/or phosphoric acid taken alone or taken further together with at least one tripolyphosphate; pyrophosphate or polymetaphosphate;
(e) from 0 mole percent up to about 40 mole percent on a dry basis of a sodium salt;
(f) from about 8 mole percent up to about 50 mole percent on a dry basis of a potassium salt;

(g) from about 0.3 mole percent up to about 16 mole percent on a dry basis of a chloride;

(h) from 0 mole percent up to about 30 mole percent on a dry basis of a carbonate and/or a bicarbonate and/or carbonic acid;

(j) from 0 mole percent up to about 2.0 mole percent on a dry basis of a monobasic glutamate and/or a dibasic glutamate and/or glutamic acid; and (k) from 0 up to about 0.6 mole percent on a dry basis of a calcium salt or may be any of the salts as disclosed in the following U.S. Pat. Nos.: 4,258,072, 4,216,244, 4,066,793, 3,821,368, 4,332,823, 4,340,614 all incorporated by reference herein.

Examples of batters useful in the practice of our invention are those of the product: "4 Turkey Patties" marketed by the Empire Kosher Poultry Inc. of Mifflintown, Pa. 17059 or "OUR BEST ® "4 Breaded Veal & Beef Patties" marketed by GSN Enterprises of Andover, Massachusetts 01810.

The breading/batter formulation may also contain such materials as cornmeal, sodium acid pyrophosphate, sodium bicarbonate, sugar, dextrose, sodium alginate and other alginates, soy flour, spices, oleoresin paprika and nonfat dry milk; as well as other ingredients well known to those having ordinary skill in the art and disclosed in the book "Batter & Breading" cited, supra, the disclosure of which is incorporated by reference herein.

For the purposes of our invention, when using the above-exemplified breading/batters, the weight ratio of flour:whole eggs may vary from about 5:95 down to about 95:5 with a preferred weight ratio of flour:whole eggs being in the range of from about 40:60 down to about 60:40.

On a water-free basis it is preferred that the weight ratio of batter/breading:barrier layer and/or barrier composition be in the range of from about 20:80 down to about 80:20 with a preferred ratio of batter/breading:barrier layer/barrier composition being in the range of from about 1.80:1 down to about 1:1.

Figure 4E:
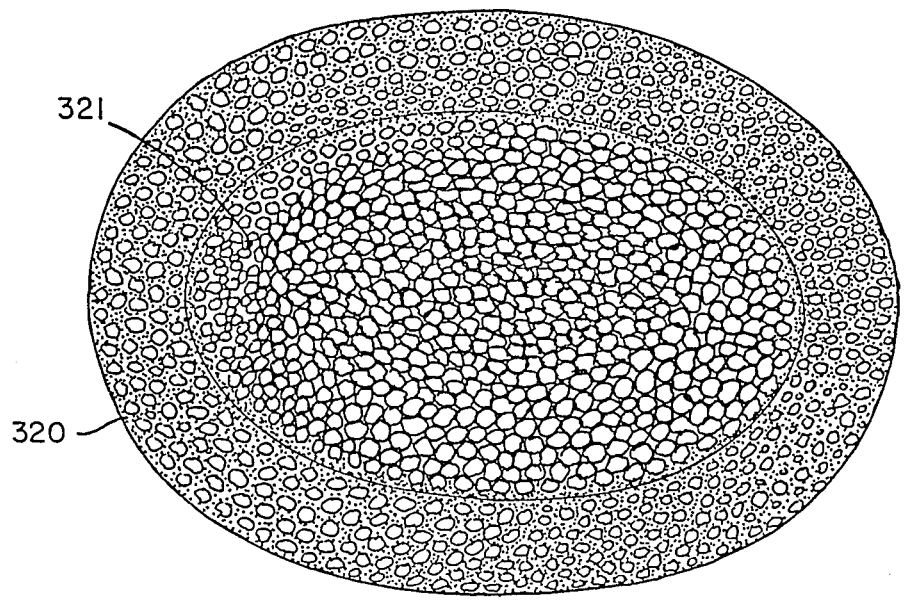
FIG. 4E is a cut-away elevation view of another embodiment of the food article of our invention wherein the porous inner food structure is coated with a proteinaceous/barrier layer which also serves as a "breading" layer.

When an article such as that illustrated in FIG. 4E is prepared, the ratio of proteinaceous substance:barrier composition (indicated by reference numeral 320 in FIG. 4E) may vary from about 10:1 down to about 1:1 with a preferred ratio of proteinaceous substance (containing fat):barrier composition being between 10:1 and 8:1 (a weight ratio). It is also preferred that the ratio of fat or polyol polyester:barrier composition be in the range of from about 5:1 down to about 1:1.

With reference to the proteinaceous and/or farinaceous inner food structure of our invention, such inner food structure may be, for example:

(i) macerated turkey meat;
(ii) macerated chicken meat;
(iii) macerated beef;
(iv) macerated veal;
(v) macerated pork;
(vi) macerated lamb;
(vii) macerated ham;
(viii) macerated fish meat;
(ix) macerated soy protein;
(x) turkey meat or turkey parts;
(xi) chicken meat or chicken parts;
(xii) beef chunks;
(xiii) veal chunks;
(xiv) pork chunks;
(xv) lamb chunks;
(xvi) ham chunks;
(xvii) fish chunks;
(xviii) bean curd;
(xix) onion rings;
(xx) potato wedges;
(xxi) sliced potatos;
(xxii) shrimp;
(xxiii) clams (with split-half shell or without shell);
(xxiv) sliced squash; and
(xxv) mixtures of any of (i)-(ix) with ground vegetables such as ground garlic or ground onion and/or ground scallion.

Examples of other proteinaceous and/or farinaceous porous inner food structures are those set forth in U.S. Pat. No. 4,681,758 issued on July 21, 1987 assigned to Phillips Petroleum Company of Bartlesville, Oklahoma, the specification for which is incorporated herein by reference, U.S. Pat. No. 4,681,758 discloses a shaped flavored beefy aroma article of manufacture having a textured outer surface and a porous inner structure which comprises in the range of 5-50 weight percent of a protein containing material (e.g., beef) and in the range of 50-95% by weight of a polymeric material. The specification of 4,681,758 is incorporated herein by reference. Also as an example for use in conjunction with the article of our invention are the extruded foodstuffs of U.S. Pat. No. 4,670,270 issued on June 2, 1987 (Germino, et al) disclosing an extruded foodstuff having a moisture resistant composition consisting essentially of alkaline metal salts of stearic acid where the extruded food product has a total amount of stearate which is between 2 and 8% by weight. It is disclosed in U.S. Pat. No. 4,670,270 that on heating the stearate forms a substantial continuous film matrix within the food which retards the absorption of moisture and retains the original texture of the coated food in the presence of moisture. The specification of U.S. Pat. No. 4,670,270 is incorporated by reference herein.

DETAILED DESCRIPTION OF THE DRAWINGS

Figure 2:
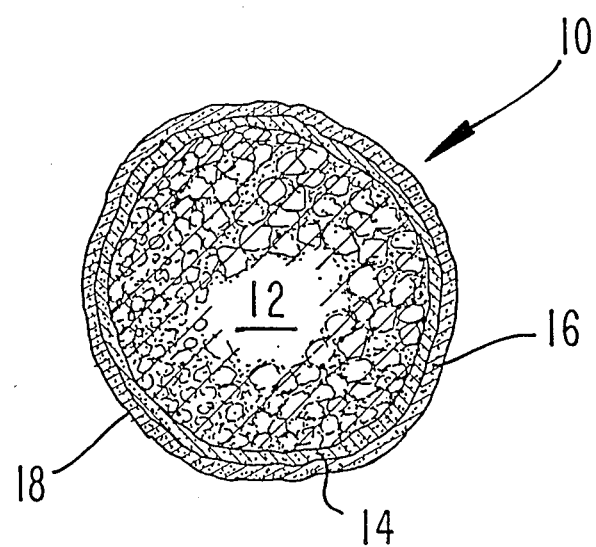
FIG. 2 is a side elevation view of the food article of FIG. 1 taken along line 2—2.

Referring to FIGS. 1 and 2, each of FIGS. 1 and 2 discloses a shaped flavored proteinaceous food article of manufacture having (i) a porous inner structure comprising a protein containing material such as ground beef which may and preferably is admixed with ground onion and garlic as well as egg yolk; an having (ii) an outer surface; the porous inner structure being indicated by reference numeral 12; and (iii) a first outer surface and coated on the first outer surface (iv) a breading coating indicated by reference numeral 14 having a breading coating surface, such breading coating comprising, for example, flavoring composition and/or a flavor precursor and/or a flavor enhancer and flour and whole eggs as indicated, supra; and (v) the breading coating having a second outer surface and coated on the breading coating surface a second coating composition (the barrier layer) indicated by reference numeral 16, the barrier layer being substantially impermeable to water and cooking oil at temperatures in the range of up to about 500° F. and comprising a starch polysaccharide (such as high amylose starch) in intimate admixture with a cellulose derivative selected from the group consisting of lower alkoxy celluloses, hydroxy lower alkoxy celluloses and acyloxy celluloses indicated by reference numeral 16 and having an outer surface 18.

FIG. 3 representing a schematic cross section diagram of another embodiment of an article of our invention shows a shaped flavored proteinaceous food article such as a hamburger having (i) a porous inner structure which comprises a protein containing material indicated by reference numeral 31, for example, ground beef mixed with garlic and egg yolk; coated by (ii) a barrier layer indicated by reference numeral 32 comprising a mixture of a flavoring composition and/or a flavor precursor and/or flavor enhancer and a starch polysaccharide in intimate admixture with the substituted cellulose and a gum and coated thereon a breading layer indicated by reference numeral 33. The barrier layer causes the overall article to be substantially impermeable to water and cooking oil at temperatures in the range of up to about 500° F. as described, supra.

The flavoring or flavoring precursor or flavor enhancer is of such a nature and is present in such a concentration and quantity as to "lock in" the "original flavor" of the proteinaceous substance present immediately after initial preparation (e.g., admixing ground onion or garlic with ground beef).

FIG. 4A sets forth a cut-away schematic cross section of another articles of our invention, a shaped flavored proteinaceous food article of manufacture having (i) a porous inner structure which comprises a protein containing material such as ground beef intimately admixed with onion and, further, intimately admixed with a barrier composition comprising an intimate admixture of a starch polysaccharide, a substituted cellulose and a gum as described, supra, and indicated by reference numeral 42; coated on the proteinaceous substance/barrier composition is a breading coating as described, supra, indicated by reference numeral 41 containing one or more flavor enhancers and/or flavoring compositions and/or flavor enhancers. The article is substantially impermeable to water and cooking oil at temperatures in the range of up to about 500° F. and has excellent original flavor retention properties (referring to the original flavor of the protein-containing material). Thus, the food article has the properties of:

(x) retention of a substantial quantity of the water originally contained in the porous inner food structure 42 on storage and/or on cooking;

(y) substantial imperviousness to the absorption or adsorption of cooking oil into the porous inner food structure 42 when the food article indicated in FIG. 4A is contacted with cooking oil on storage and/or on cooking even at temperatures up to 500° F.; and (z) retention of the original flavor properties of the porous inner food structure on storage and/or on cooking.

FIG. 4B is a cut-away elevation schematic diagram of another embodiment of a food article of our invention wherein the proteinaceous foodstuff and/or the farinaceous foodstuff indicated by reference numeral 314 is admixed with the barrier composition comprising the admixture of starch polysaccharide, substituted cellulose and gum as well as the flavor enhancer, flavor precursors and/or flavoring compositions, and coated on the porous inner food structure is a breading/barrier layer containing the ingredients of the breading, e.g., flour and egg yolk and also containing the ingredients of the barrier composition critical to the operation of our invention; namely, (i) the flavor composition and/or the flavor enhancer composition and/or the flavor precursor composition; (ii) the starch polysacchride; (iii) the substituted cellulose and (iv) the gum as described, supra with the breading/barrier layer being indicated by reference numeral 313.

FIG. 4C is a cut-away side elevation schematic diagram of another embodiment of the food article of our invention wherein the porous inner food structure which may be a proteinaceous and/or a farinaceous foodstuff such as a mixture of ground beef and onion (indicated by reference numeral 318 is coated with a barrier layer indicated by reference numeral 317). The barrier layer 317 is further coated with the breading layer (e.g., mixture of flour and egg yolk) indicated by reference numeral 316. The breading layer is further coated with the barrier layer indicated by reference numeral 315 which is an admixture of a starch polysaccharide, a substituted cellulose and a gum as described, supra. One, two or all of the aforementioned layers contains one or more flavor compositions and/or one or more flavor precursors and/or one or more flavor enhancers enabling the original flavor nuances of the article as it is originally prepared to be retained.

FIG. 4D is a cut-away side elevation schematic diagram of another embodiment of the food article of our invention wherein the porous inner food structure which may be a proteinaceous and/or a farinaceous foodstuff such as a mixture of ground beef and onion is further admixed with the barrier composition, the starch polysaccharide admixed with a substituted cellulose and a gum and is indicated by reference numeral 310. The meat/barrier porous inner food structure is further coated with barrier layer 311 comprising the starch polysaccharide, the substituted cellulose and gum and, optionally, one or more flavor compositions, one or more flavor enhancers and/or one or more flavor precursors and barrier coating 311 is further coated with breading layer 309 (e.g., flour and egg yolk and, optionally, one or more flavor compositions, one or more flavor enhancers and/or one or more flavor precursors) which is further coated with barrier layer 312 which comprises the starch polysaccharide, the substituted cellulose and gum and, optionally, one or more flavor compositions, one or more flavor enhancers and/or one or more flavor precursors. Indeed, the processes for preparing such articles as shown in FIG. 4D vary and are described, infra, in the section entitled "Detailed Description of Process and Apparatus" (infra).

FIG. 4E sets a cut-away side elevation schematic diagram of another embodiment of the food article of manufacture of our invention wherein the porous inner food structure comprising a proteinaceous and/or farinaceous foodstuff such as ground beef admixed with chopped onion indicated by reference numeral 321 (optionally, containing at least one flavor composition, at least one flavor enhancer and/or flavor precursors) is coated with a fatty proteinaceous substance/barrier composition (optionally, containing at least one flavor composition, at least one flavor enhancer and/or flavor precursors), for example, a mixture of fatty beef or a mixture of beef and sucrose polyester with the barrier composition of our invention, namely, a starch polysaccharide, substituted cellulose and gum admixture and flavor precursor mixture, e.g., the mixture of cysteine thiamine and HVP (in proportions indicated in the prior art, e.g., U.S. Pat. No. 3,394,015) indicated by reference numeral 320. On frying or cooking, the meat/barrier layer containing flavor precursors, and/or flavor enhancers and/or flavors, 320 forms into a "batter/-breading/barrier/flavor" coating acting as both a breading and barrier and flavor retaining layer which has the properties of:
- (x) acting as a breading;
- (y) retention of a substantial quantity of water originally contained in the porous inner food structure on storage and/or on cooking;
- (z) substantial imperviousness to the absorption or adsorption of cooking oil into the porous inner food structure when the food article is contacted with cooking oil on storage and/or on cooking; and
- (w) substantial retention of the original flavor of the proteinaceous composition and enhancement of the flavor of the proteinaceous composition prior to processing.

FIG. 6 is a theoretical model of the physical adhesion of the breading indicated by reference numeral 66 and barrier coating indicated by reference numeral 69 to poultry skin without the cuticle, indicated by reference numeral 64. The model features are dermis indicated by reference numeral 64; stratum germinativum indicated by reference numeral 65; breading coating matrix indicated by reference numeral 66, coating ground substance, e.g., breading and bread crumbs indicated by reference numeral 61; coating particles indicated by reference numeral 62; primary binding forces indicated by reference numeral 63A, 63B and 63C (using arrows) and secondary binding forces.

FIG. 7 is a schematic diagram of a theoretical model of physical adhesion of the barrier and breading to poultry skin with cuticle. The poultry skin is indicated by reference numerals 76 and 77. The barrier coating is indicated by reference numeral 72 and the breading coating is indicated by reference numeral 79. The model features are dermis indicated by reference numeral 76; stratum germinativum indicated by reference numeral 77; stratum corneum indicated by reference numeral 78; coating matrix including bread crumbs indicated by reference numeral 79; coating ground substance indicated by reference numeral 71; coating particles indicated by reference numeral 72; primary binding forces indicated by reference numerals 73A and 73B; and secondary binding forces indicated by reference numerals 74A, 74B and 75 using arrows.

DETAILED DESCRIPTION OF THE PROCESS AND APPARATUS

FIGS. 5A, 5B, 8, 9, 10, 11, 12, 13 and 14 set forth process flow diagrams and apparatus diagrams used in creation of the food articles of our invention.

In carrying out the process of our invention, a porous inner food structure comprising water and a proteinaceous and/or a farinaceous foodstuff is first provided (e.g., the formation of a ground turkey or ground fish or ground beef pattie or the provision of an onion ring previously seasoned, for example. Optionally, flavor precursors, flavor compositions and/or flavor enhancers may be added.

The resulting product may be gently heated or may be kept in its raw state.

The resulting product may then be coated with a breading and batter, e.g., flour and egg yolk with bread crumbs or it may be coated first with the barrier composition comprising the admixture of a starch polysaccharide, a substituted cellulose and a gum, optionally, containing one or more flavor compositions, and/or one or more flavor precursors and/or one or more flavor enhancers. The resulting coated product may then be heated to cooking temperature, e.g., 250°–400° F. and retained at that cooking temperature for a period of time from about 1 minute up to about 10 minutes or it may not be cooked and may be simply further coated with an additional breading and/or barrier composition optionally "phrase", and the final product may be cooked at temperatures in the range of 250° F. up to about 500° F.; or the resulting product may be further coated with a barrier composition and/or breading composition and finally cooked at temperatures in the range of 250°–500° F. for a period of time of from about 5 minutes up to about 15 minutes or it may be cooked in a microwave oven for lesser periods of time using higher amounts of microwave energy.

In the alternative, the provision of the porous inner proteinaceous and/or farinaceous food structure, e.g., 321 in FIG. 4E is coated with a pre-mix of proteinaceous, fatty barrier substance, optionally, containing one or more flavor compositions, and/or one or more flavor precursors and/or one or more flavor enhancers and then cooked in either a microwave oven or otherwise (using prior art cooking operations) whereby the breadings/batter/barrier layer is created to produce the article of FIG. 4E.

Referring then to FIG. 5A, proteinaceous or farinaceous foodstuff is provided at 50 and macerated at location 51 and then blended with seasonings from location 53 at location 52 and then compacted into patties at location 54 and then coated at location 56 with breading and/or barrier composition from location 55. The resulting coated compacted proteinaceous or farinaceous foodstuff is then fried or microwaved at location 57 and the fried or microwaved pattie is then coated again with a breading and/or barrier film from location 59 the coating carried out at location 58. The resulting doubly coated pattie is then reheated via microwave or frying at location 590 and marketed or stored at location 591.

Figure 5B:
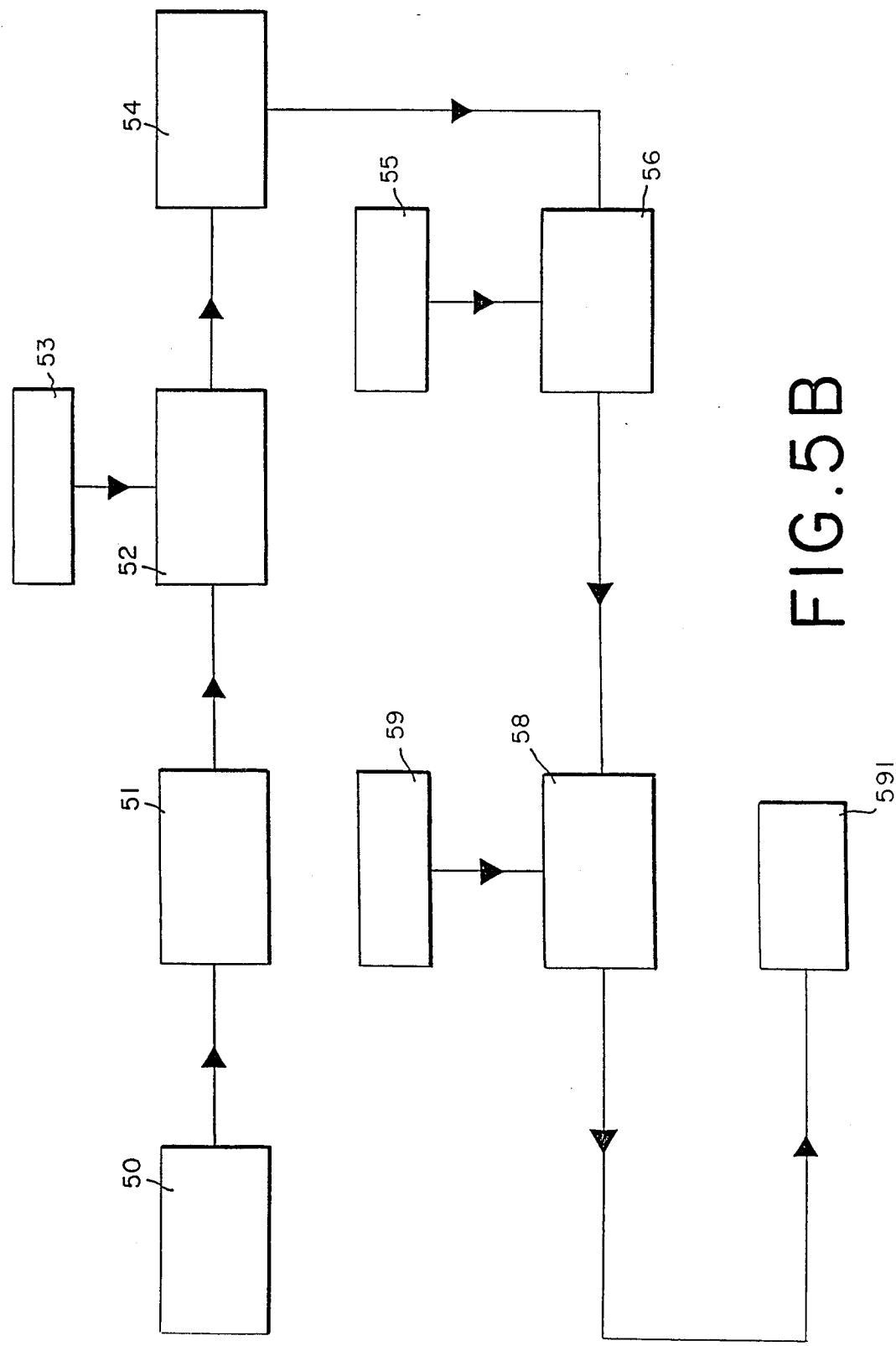
FIG. 5B is another embodiment of the process of our invention for preparing the food article of our invention without the optional frying steps.

FIG. 5B indicates the same process as FIG. 5A except that it is without the frying process steps and omits the frying or microwaving at locations 57 and 590.

Figure 11:
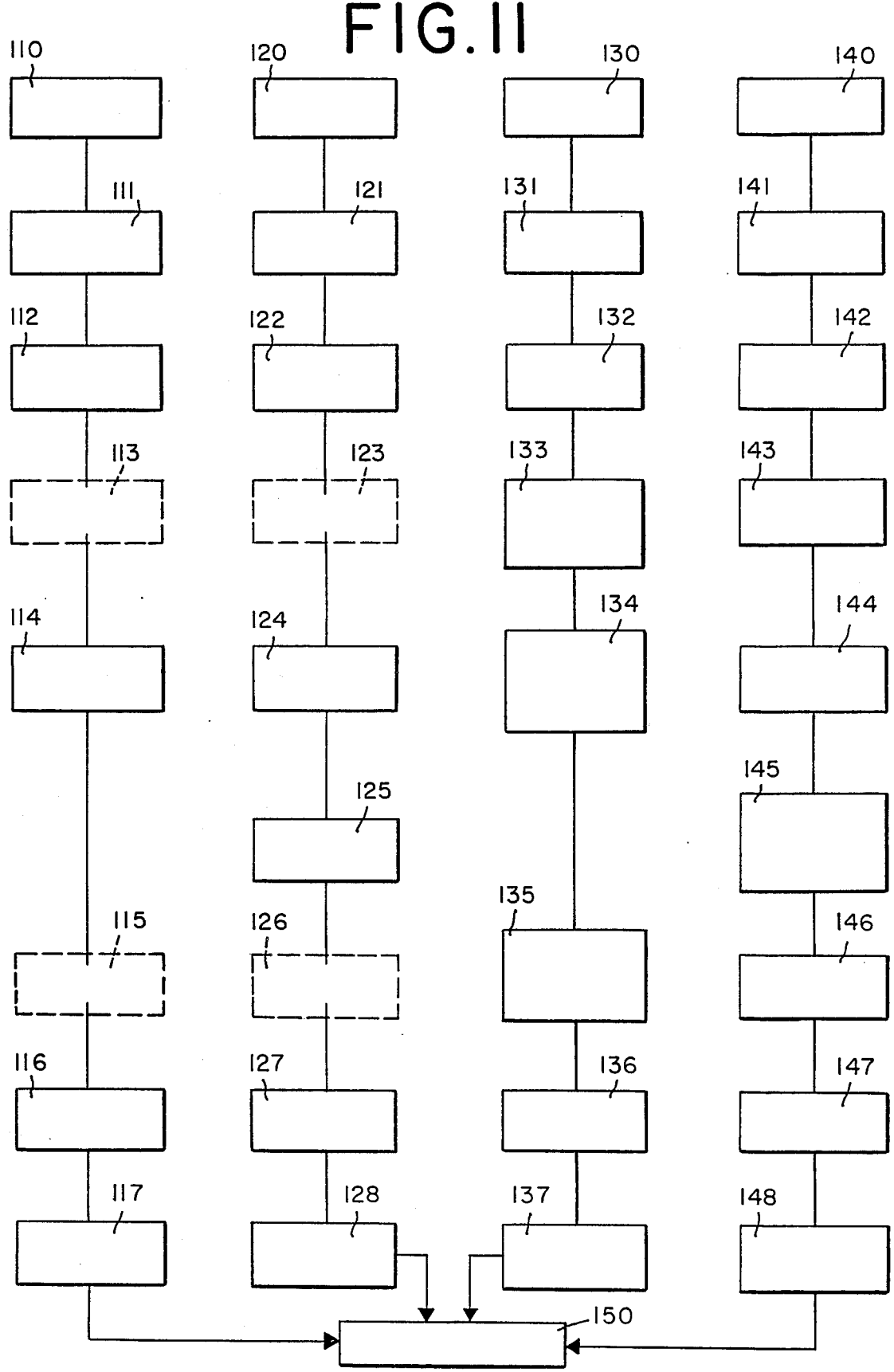
FIG. 11 is a schematic process flow chart illustrating four basic coating systems for coating batter and barrier layer(s) onto the porous inner food structure of our invention to produce the food article of our invention. It is a modification of figure 10.3 on page 125 of the book "BATTER AND BREADING" cited, supra.

Referring to FIG. 11, FIG. 11 shows four basic types of batter/breading/barrier layer coating processes for the coating of porous inner food structures comprising proteinaceous and/or farinaceous foodstuffs, to wit: The single line process indicated by reference numeral 110; the tandum line process indicated by reference numeral 120; the tempora or batter-fry process indicated by reference numeral 130 and the tempora-Japanese process indicated by reference numeral 140.

In reference to the single line process 110 the porous inner food structure is provided at reference numeral 111 with a dry season coating at reference numeral 112 and a pre-dust (optional) at location 113 followed by the batter/bread coating at reference numeral 114 followed by the optional frying step at reference numeral 115 followed by the barrier coating step at reference numeral 116 followed by the frying step at reference numeral 117 followed by the freezing/packing step indicated by reference numeral 150.

The tandem line process 120 shows the provision of the porous inner food structure at reference numeral 121 followed by the dry season coating at reference numeral 122 followed by the pre-dust (optional) operation at reference numeral 123 followed by the batter/breading coating at reference numeral 124 followed by a second batter/breading coating at reference numeral 125 followed by an optional frying step at reference numeral 126 followed by the barrier coating step at reference numeral 127 followed by the frying step at reference numeral 128 followed by the freezing and packing step at reference numeral 150.

The tempura or batter fry line process 130 shows the provision of the porous inner food structure at reference numeral 131 followed by the wet seasoning coating step at reference numeral 132 followed by the pre-dust step at reference numeral 133 followed by the batter or tempura application step at reference numeral 134 followed by the special tempura style frying step at reference numeral 135 followed by the barrier coating step at reference numeral 136 followed by the frying step at reference numeral 137 followed by the freezing and packing step at reference numeral 150.

The tempura-Japanese process 140 is indicated by reference numerals 140-150 inclusive and begins with the provision of the porous inner food structure at reference numeral 141 followed by the dry seasoning coating at reference numeral 142 followed by the pre-dust step at reference numeral 143 followed by tempura applicators step at reference numeral 144 followed by the special Japanese breading applicator step at reference numeral 145 followed by the frying step at reference numeral 146 followed by the barrier coating step at reference numeral 147 followed by the frying step at reference numeral 148 followed by the freezing and packing step at reference numeral 150.

Figure 12:
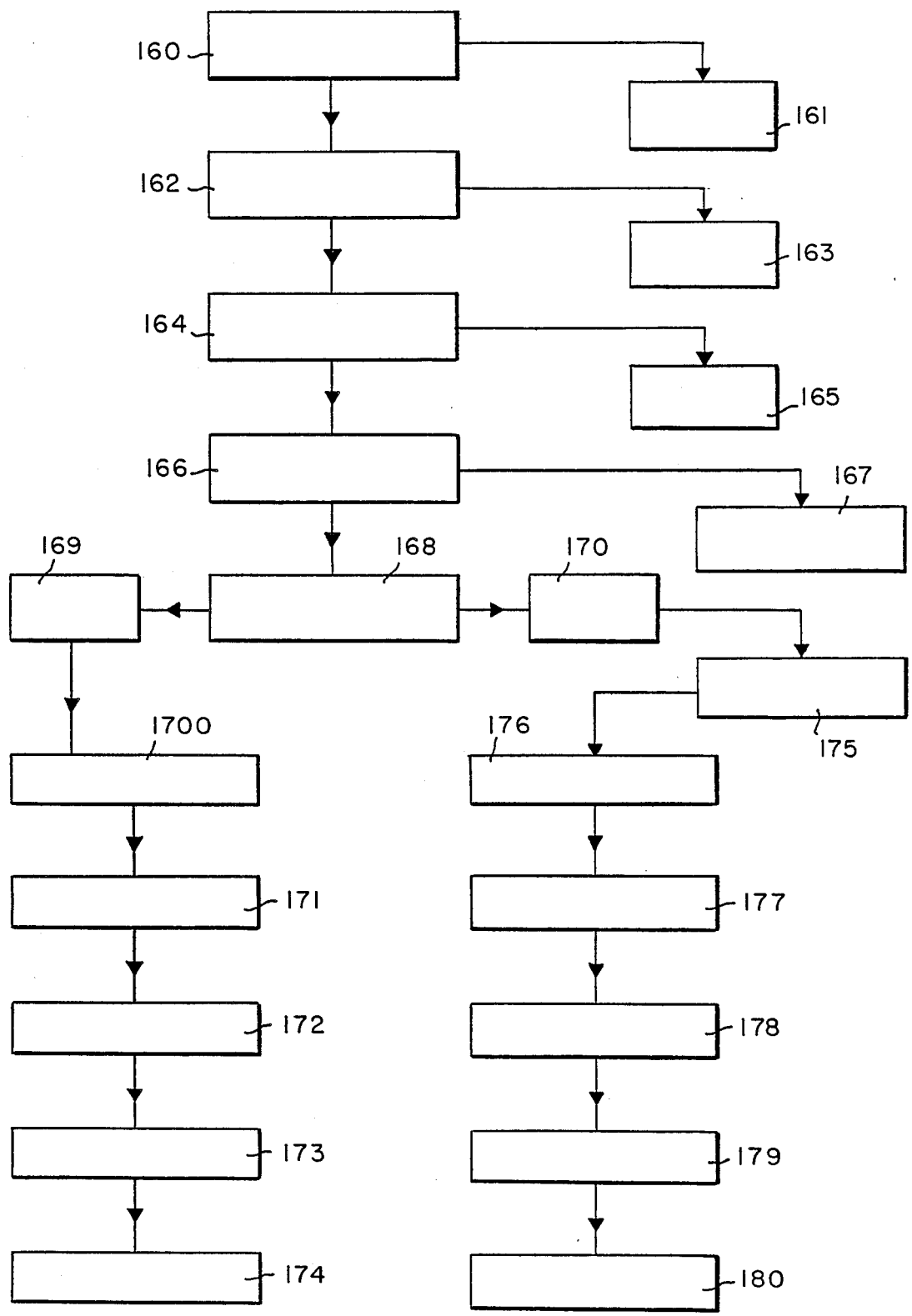
FIG. 12 sets forth a schematic block flow diagram for the production of breaded onion rings having thereon a barrier layer of our invention. It is a modification of figure 6.1 of the book "BATTER AND BREADING" cited, supra.

FIG. 12 sets forth a process flow diagram for the creation of fried onion rings, another embodiment of our invention. Top and butt onions are provided at reference numeral 160 (with waste at 161) and outer skins are peeled at reference numeral 162 (with waste at reference numeral 163). The onions are sliced at reference numeral 164 (with waste at 165). The ring separation is indicated at reference numeral 166 (with waste at reference numeral 167). The coating application for the breading and batter is indicated at reference numeral 168. The raw breaded rings are then coated from location 170 with barrier layer and pre-fried rings 170 are pre-fried at location 175; blast-frozen at reference numeral 176 and coated with barrier layer at reference numeral 177. The pre-fried rings are packaged at location 178, cased at location 179 and placed in a holding freezer at location 180. The raw breaded rings 169 are packaged at location 171; blast-frozen at location 172; cased at location 173 and placed in holding freezer at location 174.

FIGS. 8, 9, 10, 13 and 14 set forth schematic diagrams of apparatus used for the production of the articles of our invention.

Figure 8:
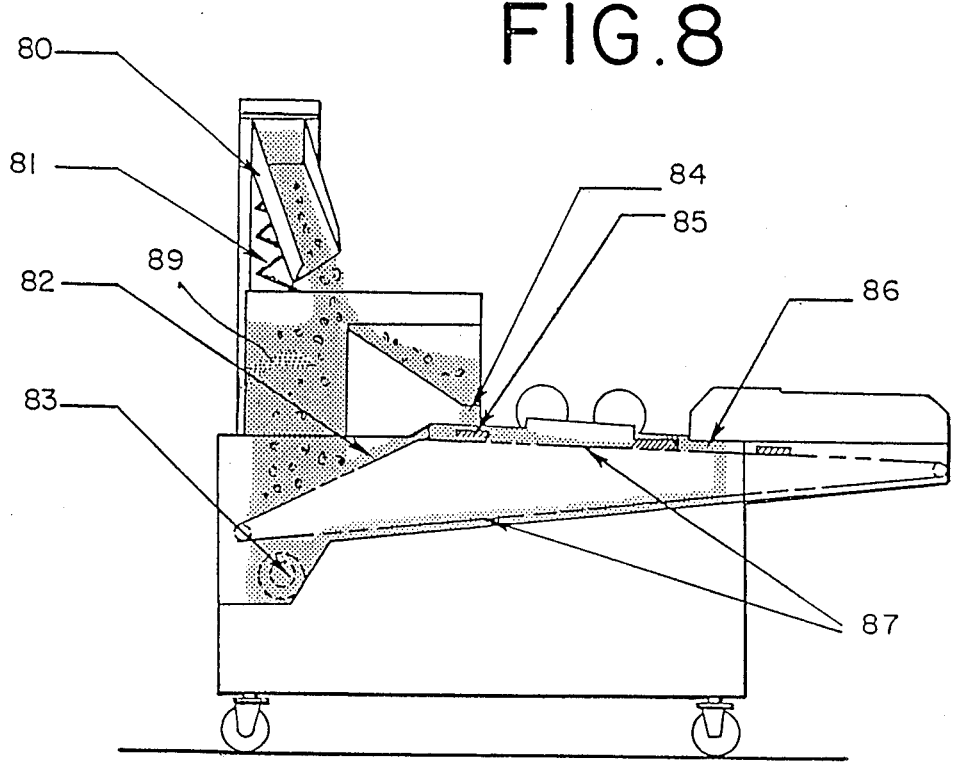
FIG. 8 is a schematic diagram of a breading/barrier layer coating machine of our invention showing the basic apparatus needed in coating the breading and barrier layer on the food article of our invention. It is a modification of figure 10.12 of the book "BREAD AND BREADING" cited, supra.

FIG. 8 sets forth a schematic diagram of a breading-/barrier coating machine showing the basic principal of breading flow/recirculation.

Free-flowing chute 80 is operated with vertical screw flighting 81 in connection with provision of breading or breading and barrier composition mixture (containing, in addition, one or more flavor compositions and/or one or more flavor precursors and/or one or more flavor enhancers) indicated by reference numeral 89. Breading top layer 84 or breading/barrier top layer 84 is coated on the inner porous food structure being breaded and coated 85 located on breader and coating belt 87 operated using cross feed screw 83 which carries the breading and barrier coating composition across the breader/coater to the vertical screw. The operation of the apparatus is carried out using belt vibrators 86. Reference numeral 82 refers to the breading/barrier layer bottom layer.

Figure 9:
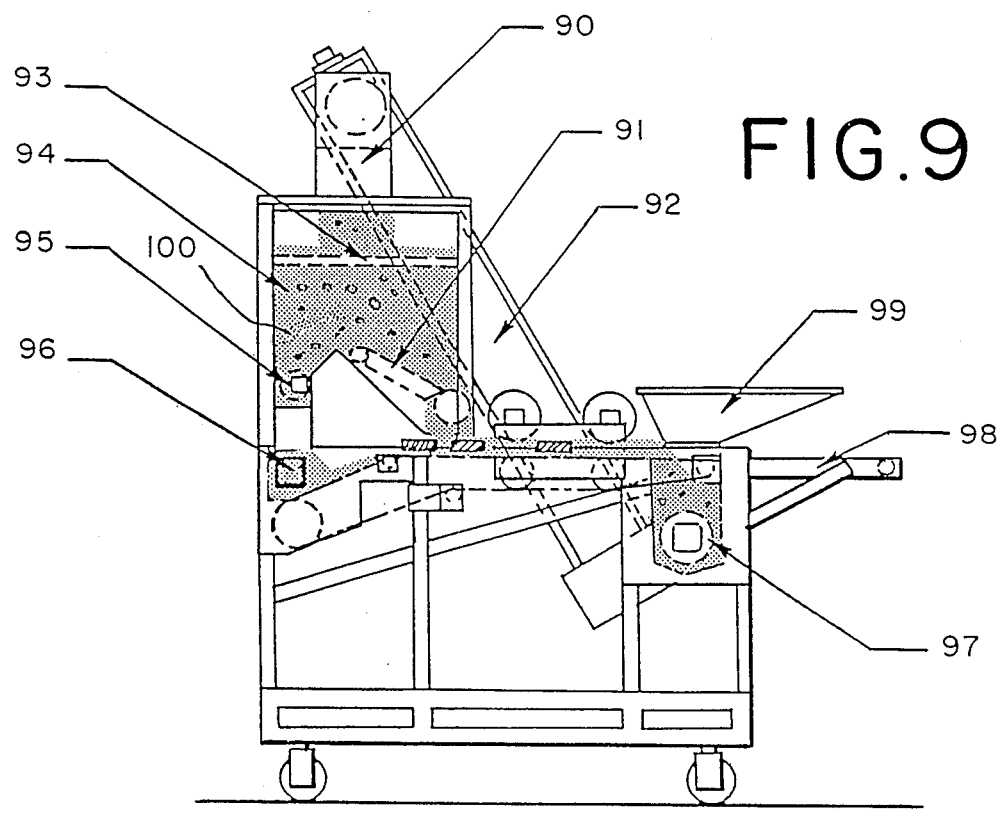
FIG. 9 is a schematic elevation diagram of another embodiment of the apparatus of our invention setting forth a recirculation system used in running non-free-flowing breadings taken together with barrier layers for the food article of our invention. It is a modification of figure 10.18 on page 144 of the book "BATTER AND BREADING" cited, supra.

FIG. 9 illustrates a recirculation system used in running non-free-flowing breading/barrier coating compositions (containing, in addition, one or more flavor compositions and/or one or more flavor precursors and/or one or more flavor enhancers). Areas of the machine restrict the movement of the material.

Thus, breading/barrier coating indicated by reference numeral 100 is provided through sifter/conveyor 93 and non-free-flow hopper 94 using hopper feed screw 95 and spreader screw 96. The breading/barrier layer composition moves on to hopper top flow belt 91 using cross feed screw 97. Reference numeral 99 indicates the feed hopper of the apparatus and reference numeral 98 indicates the level glide discharge conveyor.

Figure 10:
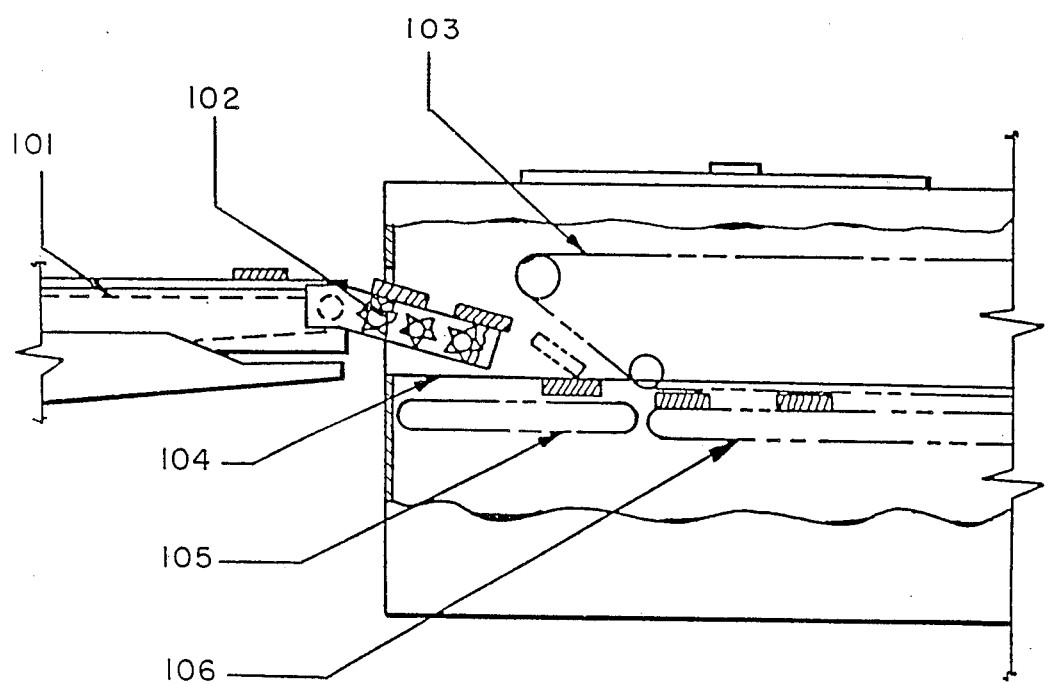
FIG. 10 is a schematic cut-away elevation diagram of another apparatus of our invention used in producing the food article of our invention and also used in carrying out the process of our invention. It is an arrangement of star rollers on a tempura batter/barrier layer applicator onto the food article of our invention. It is a modification of figure 10.9 on page 133 of the text "BATTER AND BREADING" cited, supra.

FIG. 10 sets forth an arrangement of Star Rollers on a tempura/barrier layer applicator.

Reference numeral 101 indicates the tempura batter/barrier layer belt. Reference numeral 102 represents the 4 Star Roll Transfer used to feed the fire. Reference numeral 103 indicates the fryer top submerger belt. Reference numeral 104 represents the fryer oil level. Reference numeral 105 represents the fryer infeed conveyor belt. Reference numeral 106 represents the fryer main conveyor belt.

Figure 13:
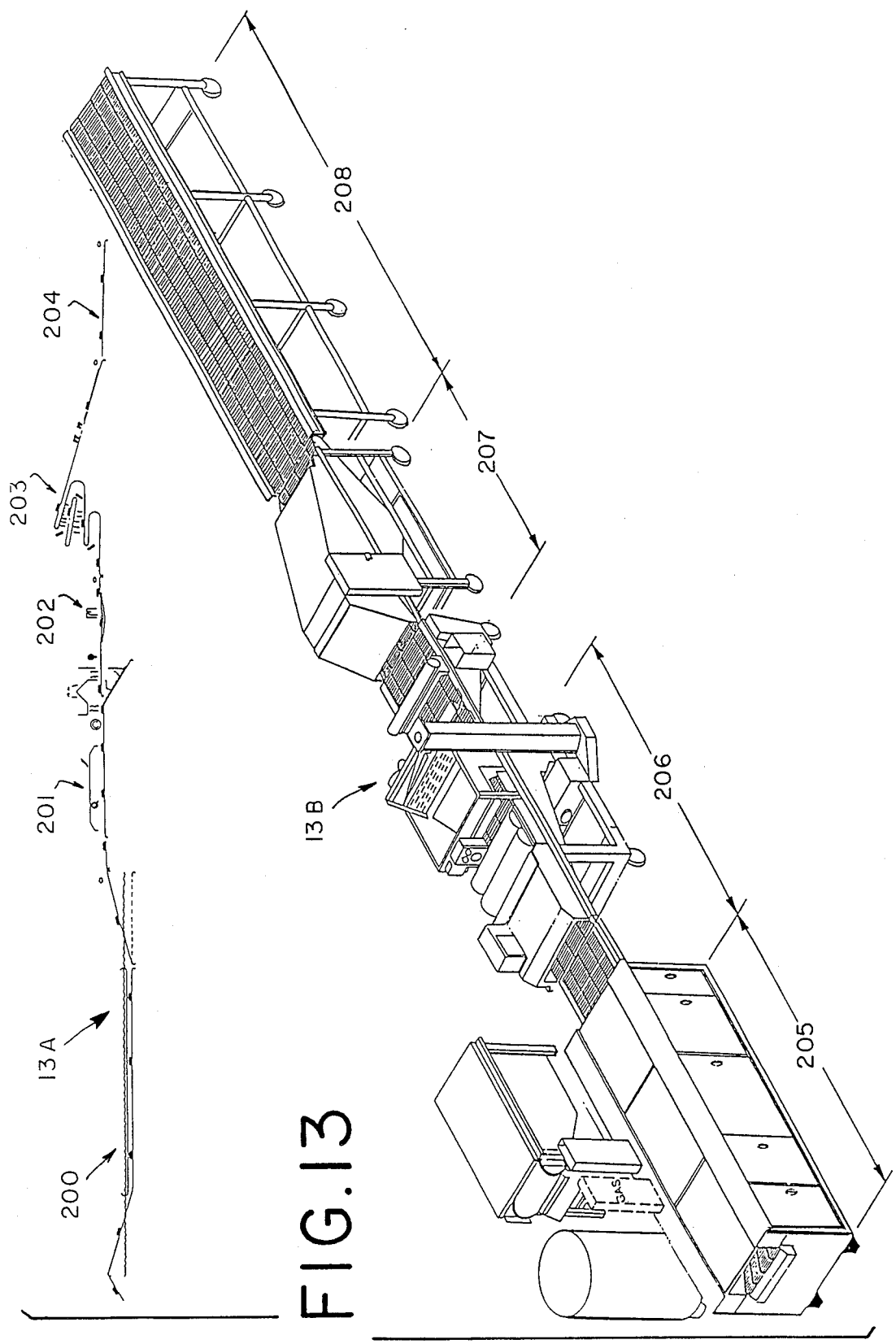
FIG. 13 sets forth an isometric and line layout showing a flip preduster and a batter-breading/barrier coating machine, an embodiment of the apparatus of our invention. It is a modification of figure 10.1 of the book "BATTER AND BREADING" cited, supra.

FIG. 13 is an isometric (FIG. 13B) and line layout (FIG. 13A) showing a flip preduster and a batter-breading/barrier layer machine useful in producing the articles of our invention. The line layout is indicated in general by reference numeral 200. The isometric layout is indicated by reference numeral 205 (in general). With respect to FIG. 13A the breader and coater is indicated by reference numeral 201 and with respect to FIG. 13B the breader and coater is indicated by reference numeral 206. With reference to FIG. 13A, the batter is indicated as being applied at reference numeral 202 and the pre-dust operation is indicated at location 203. The flip preduster in FIG. 13B is indicated by reference numeral 207 and the infeed conveyor is indicated by reference numeral 204 in FIG. 13A and is indicated by reference numeral 208 in FIG. 13B.

Figure 14:
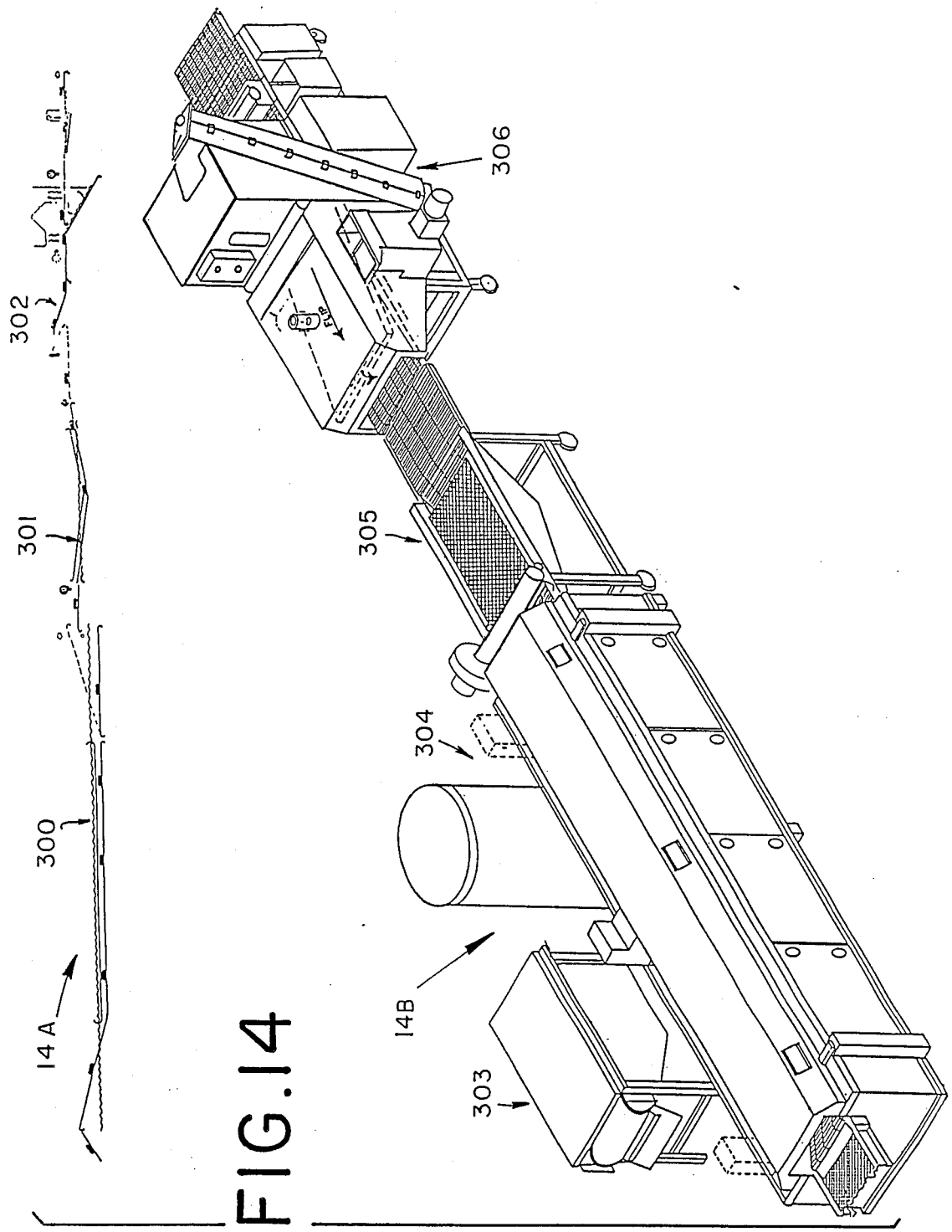
FIG. 14 is an isometric and line layout illustrating a batter fry/barrier layer coating process and apparatus used therefor of our invention. It is a modification of figure 10.4 of the book "BATTER AND BREADING" cited, supra.

FIG. 14 sets forth an isometric (FIG. 14B) and line layout (FIG. 14A) illustrating a batter/barrier layer fry process. The application of the hot oil filter is indicated by reference numeral 303 in FIG. 14B. The tempura style frier is indicated by reference numeral 300 in FIG. 14A and is indicated by reference numeral 304 in FIG. 14B. The tempura applicator is indicated by reference numeral 301 in FIG. 14A and is indicated by reference numeral 305 in FIG. 14B. The batter and breader and barrier layer coater setup is indicated by reference numeral 302 in FIG. 14A and is indicated by reference numeral 306 in FIG. 14B.

The following examples are given to illustrate embodiments of our invention as it is preferably preferred to practice it. It will be understood that these examples are illustrative and the invention is not to be considered as restricted thereto except as indicated in the appended claims.

EXAMPLES I-VII

The following table sets forth mixtures of salts (with each salt given as a weight percentage) to produce mixed seasonings useful in the practice of our invention. Each mixture is given as a separate example. Each of the mixtures of each of the examples will be used in examples following Example XVI.

TABLE I

| Ingredient | I | II | III | IV | V | VI | VII |
|---|---|---|---|---|---|---|---|
| $KH_2PO_4$ | — | 72.38 | 73.12 | 72.42 | 75.62 | — | — |
| Lactic Acid 22% | 3.09 | 2.09 | 2.11 | 2.09 | 2.18 | 3.0 | 2.29 |
| Glycolic Acid 85% | 0.08 | 0.05 | — | — | — | — | — |
| $Mg_3(PO_4)_2.4H_2O$ | 10.90 | — | — | — | — | — | — |
| $CaHPO_4.2H_2O$ | 0.90 | 0.61 | — | 0.61 | 0.50 | 0.70 | — |
| NaCl | 5.24 | 3.54 | 3.58 | 3.54 | 3.70 | 5.10 | 15.22 |
| KCl | 0.52 | 0.35 | — | 0.35 | 0.38 | 0.50 | 0.38 |
| Monosodium Glutamate.$H_2O$ | 2.90 | 1.96 | 1.98 | 1.96 | 2.06 | 2.82 | 2.15 |
| $NaHCO_3$ | 22.02 | — | 15.04 | 14.90 | 15.56 | 21.38 | — |
| $KHCO_3$ | — | 14.89 | — | — | — | — | — |
| $K_2CO_3$ | 54.35 | — | — | — | — | — | — |
| $MgCO_3$ | — | 4.13 | 4.17 | 4.13 | — | — | — |
| $K_2HPO_4$ | — | — | — | — | — | 66.50 | 79.24 |
| Calcium Chloride | — | — | — | — | — | — | 0.72 |

EXAMPLES VIII–XVI

The following Table II sets forth mixtures of non-sodium-containing salts to produce mixed seasonings useful in the practice of our invention. Each mixture is given as a separate example. Each of the mixtures of each of the examples will be used in examples following the instant Examples VIII–XVI:

TABLE II

| Ingredient | VIII | IX | X | XI | XII | XIII | XIV | XV | XVI |
|---|---|---|---|---|---|---|---|---|---|
| $KH_2PO_4$ | 90.98 | 85.94 | 89.16 | 94.06 | 86.61 | 92.18 | 95.90 | 79.24 | 93.84 |
| Lactic Acid 22% | 2.62 | 2.48 | 2.57 | 4.24 | 3.91 | 4.16 | 2.77 | 2.29 | 2.71 |
| $CaHOP_4.2H_2O$ | 0.77 | 0.72 | 0.75 | 0.99 | 0.91 | 0.97 | — | — | — |
| $CaCl_2$ | — | — | 0.43 | — | — | — | 0.87 | 0.72 | 0.85 |
| KCl | 0.44 | 3.96 | — | 0.71 | 5.75 | 0.69 | 0.46 | 15.60 | 0.45 |
| $MgCO_3$ | 5.19 | 4.90 | 5.08 | — | — | — | — | — | — |
| Monopotassium Glutamate.$H_2O$ | — | 2.00 | 2.00 | — | 2.82 | 2.00 | — | 2.15 | 2.15 |

The foregoing examples, shown in mole percents of anions, cations, and substantially nonionic acids (e.g., lactic acid) are set forth in terms of such ions and free acids in Table III below.

TABLE III

| Ingredient | VIII | IX | X | XI | XII | XIII | XIV | XV | XVI |
|---|---|---|---|---|---|---|---|---|---|
| $K^+$ | 45.3% | 45.6% | 45.5% | 49.30% | 49.3% | 49.3% | 49.0% | 49.2% | 49.0% |
| $H_2PO_4^-$ | 45.0% | 41.6% | 44.4% | 48.60% | 43.2% | 47.9% | 48.6% | 35.7% | 47.8% |
| $HPO_4^=$ | 0.3% | 0.276% | 0.297% | 0.402% | 0.359% | 0.399% | — | — | — |
| $Ca^{++}$ | 0.3% | 0.277% | 0.297% | 0.722% | 0.359% | 0.399% | 0.545% | 0.401% | 0.515% |
| $Cl^-$ | 0.398% | 3.5% | 0.392% | 0.662% | 5.25% | 0.658% | 1.51% | 13.61% | 1.49% |
| $Mg^{++}$ | 4.15% | 3.84% | 4.11% | — | — | — | — | — | — |
| $CO_3^=$ | 4.15% | 3.84% | 4.11% | — | — | — | — | — | — |
| Lactic acid | 0.434% | 0.396% | 0.425% | — | 0.646% | 0.694% | 0.465% | 0.342% | 0.458% |
| Glutamate ion | — | 0.65% | 0.668% | — | 0.942% | 0.696% | — | 0.650% | 0.735% |

Table IV below sets forth the mole ratio of metal cation (e.g., potassium ion, calcuim ion and magnesium ion) to total moles of anion, cation and free acid, e.g., lactic acid.

TABLE IV

| Ingredient | VIII | IX | X | XI | XII | XIII | XIV | XV | XVI |
|---|---|---|---|---|---|---|---|---|---|
| Mole ratio of metal cation: anion + cation + free acids | 0.498 | 0.499 | 0.498 | 0.497 | 0.497 | 0.496 | 0.495 | 0.496 | 0.496 |

EXAMPLE XVII

The following ingredients are refluxed for four hours:

| Ingredient | Parts by Weight |
|---|---|
| L-Cysteine hydrochloride | 0.9 |
| Carbohydrate-free vegetable protein hydrolysate | 30.9 |
| Thiamine hydrochloride | 0.9 |
| Water | 67.30 |

The resulting mixture is then aged for three days and an aliquot portion is withdrawn and dried. Based on the weight of the dry solid obtained, sufficient gum arabic is added to the batch to provide a composition containing one part by weight of gum arabic. The composition is then spray-dried.

Ethyl (2-methyl-3-furyl) disulfide is added to the spray-dried material at the rate of 4 ppm.

The resulting material has a beef liver flavor. To this material is added, in separate portions, each of the mixed seasonings of any one of Examples I–XVI at levels of 4%, 8%, 12%, 15% and 25%.

Each of the resulting materials has an excellent "rare" beef liver flavor which will be added to the ground beef patties in examples set forth, infra. Each of the beef patties has an excellent "cooked liver/rare flavor nuance".

EXAMPLE XVIII

The following ground beef mixture is prepared:

| Ingredient | Parts by Weight |
| --- | --- |
| Ground beef | 200.0 |
| Beef suet | 120.0 |
| Ice/NaCl (50:50 mixture) | 200.0 |
| Potato flour | 100.0 |
| Anhydrous bread crumbs | 140.0 |
| Dry milk powder | 20.0 |
| Standard spice flavor | 10.0 |
| containing: | |
| Oil of cumin | 1.6 |
| Oil of mustard | 3.3 |
| Oil of celery | 3.3 |
| Oil of ginger | 5.2 |
| Oil of cloves | 14.3 |
| Oil of coriander | 17.6 |
| Oil of pimenta berries | 22.0 |
| Oil of black pepper | 43.0 |
| Oleoresin capsicum | 373.0 |
| Oil of nutmeg | 500.0 |

To portions of the above mixture, 0.02% by weight of each of the flavor/salt formulations of Example XVII is added (at the level of 5 parts by weight).

The resultant beef patties are then used as the inner porous protein structures for the following Examples XIX, XX and XXI.

EXAMPLE XIX

Into a 2 liter reaction vessel equipped with heater is placed 500 grams of water. The water is heated to 190° F. and 40 grams of METHOCEL ®A15-LY and 1.0 grams of KELTROL ® xanthan gum is added with stirring.

METHOCEL ®A15-LV is a methylcellulose composition manufactured by Dow Chemical Company of Midland, Michigan 48674 containing 97% methylcellulose; 2% water and 1% sodium chloride. KELTROL ® xanthan gum manufactured by the Keltrol Corporation of Okmulgee, Oklahoma. 30 Grams of "CRISP FILM ®, amylose corn starch manufactured by National Starch & Chemical Corporation, Food Products Division of Finderne Avenue, P. O. Box 6500, Bridgewater, New Jersey 08807 is then added to the resulting mixture. The resulting product is stirred and 234 grams of cold water together with 30 grams of Benesol 15, a modified starch manufactured by National Starch & Chemical Corporation, Food Products Division. It is a coarsely ground, pre-cooked tapioca starch and is used to aid in the dispersion of the product. While stirring at 190° F., 234 grams of water is added. The resulting mixture is then cooled to room temperature and 80 grams of flour and 85 grams of whole eggs are added to the mixture. The entire mixture is then used to coat each of the porous inner food structures of Example XVII. The product is cooked until it is brown on both sides (at a temperature of approximately 350° F. (frying temperature). The resulting products are all substantially impervious on additional heating to cooking oil and retain substantially all of their moisture internally.

EXAMPLE XX

Into a 2 liter vessel equipped with stirrer, thermometer and heating mantle is placed 136.8 grams of METHOCEL ®A15-LV (methylcellulose composition produced by Dow Chemical Company of Midland, Michigan 48674 containing 97% methylcellulose, 2% water and 1% sodium chloride); 3.20 grams of KELTROL ® (xanthan gum) manufactured by Kelco Company of Okmulgee, Oklahoma, 586.20 grams of CRISP FILM ®, Amylose Starch manufactured by the National Starch & Chemical Corporation, Food Products Division; 65.40 grams of "National 78-0104" a coarsely ground pre-cooked tapioca starch; 65.40 grams of "PURE FLO ®" a modified food starch derived from waxy maize manufactured by the National Starch & Chemical Corporation, Food Products Division; 13.0 grams of the salt mixture of Example I, supra; 65.0 grams of sodium chloride and 65.0 grams of CERELOSE ®2001. Sufficient water is added to cause the resulting product to be coatable onto each of the porous inner food structures of Example XVIII. The resulting product is then coated onto the porous food structures of Example XVIII at a level of 1:10 weight:weight of barrier coating composition:porous inner food structure.

The resulting product is fried for a period of 20 minutes in an oven operating at 375° F. At the end of the 20 minute period, the resulting coated product is cooled and a batter is prepared containing 15 parts by weight of corn flour; 30 parts by weight of bleached wheat flour; 14 parts by weight of potato flour; 15 parts by weight of dextrose; 40 parts by weight of whole eggs; and 40 parts by weight of bread crumbs. The resulting breading is coated to cover the surface of the barrier layer coated porous inner food structure in its entirety. The weight ratio of breading:barrier-coated porous inner food structure is 2:10. The batter/breading coating also contains 60 parts by weight of water. The resulting batter-coated product is then baked at a temperature of 450° F. in a toaster oven for a period of 18 minutes.

Each of the resulting products has the properties of:
(a) retention of a substantial quantity of the water originally contained in each of the porous inner food structures notwithstanding the two cooking cycles; and
(b) substantial imperviousness to absorption or adsorption of cooking oil into the porous inner food structure when the resulting articles are each cooked further with cooking oil beyond the cooking steps set forth in the instant example, supra.

EXAMPLE XXI

PART I:

Into a 15 kelo steam is placed 8,000 grams of water at room temperature. The water is heated to 195° F. and then 1,200 grams of METHOCEL ®A15-LV is dispersed in the water using an agitator. The METHOCEL ®A15-LV is dispersed thoroughly. The resulting mixture is held for further processing in Part III, infra;

PART II:

Into a 1 gallon blender is placed 3,000 grams of water at room temperature. 300 Grams of salt flour and 24 grams of keltrol (xanthan gum) is dispersed thoroughly into the water with agitation. To the resulting mixture CERELOSE ®2001 (300 grams) is added with stirring. (CERELOSE ®2001 is dextrose monohydrate). To the mixture 150.0 grams of the salt of Example II, supra is added and dispersed by means of strong agitation.

The mixture of the instant Part II is also held to be used in Part III, infra.

PART III:

Into a 30 liter tank is placed 11,176 grams of water at room temperature. The agitator is turned on and operated at 90% of its maximum rpm.

A blend of 600 grams of "National 78–1-4" (a coarsely ground pre-cooked tapioca starch) and 300 grams of PURE FLO ® modified food starch derived from waxy maize) is blended into the water. The resulting product is dispersed thoroughly and blended in order to remove all lumps.

Over a period of 15 minutes, 4,950 grams of CRISP FILM ® (a modified high amylose corn starch manufactured by National Starch and Chemical Corporation) is added and dispersed thoroughly in the resulting mixture.

The entire product produced according to Part II, supra is then added to the resulting mixture. The resulting mixture is stirred for a period of 2 minutes.

The entire product produced according to Part I, supra, is then added to the resulting mixture with stirring for a period of 2 minutes.

Portions of the resulting mixture are then coated onto each of the porous inner food structures produced according to Example XVIII in a weight ratio of 0.07:10 of barrier coating:porous inner food structure.

To the barrier-coated porous inner food structure a batter containing 60 parts by weight of water; 40 parts by weight of whole eggs; 40 parts by weight of corn flour; 40 parts by weight of whole wheat flour; and 40 parts by weight of corn flour is placed on the untreated barrier coated surface of the porous inner food structures of Example XVIII. The weight ratio of batter:-coated porous inner food structure in each case is 0.6:10. The resulting batter coated-barrier layer coated porous inner food structures of Example XVIII are then heated in a toaster oven at 450° F. for a period of 20 minutes.

Each of the batter coated barrier layer coated porous inner food structures thus produced has the properties of:
   (x) retention of a substantial quantity of the water originally contained in the porous inner food structure on further cooking;
   (y) substantial imperviousness to the absorption or adsorption of cooking oil into the porous inner food structure when the each of the food articles of Example XVIII is contacted with cooking oil on further cooking beyond the cooking set forth in the instant example.

What is claimed is:

1. A process for preparing a food product consisting of the steps of:
   (1) providing a porous inner food structure consisting of a mixture of water and macerated beef or macerated chicken meat;
   (2) admixing a starch, methyl cellulose, xanthan gum and one or more reaction flavor compositions and-/or reaction flavor precursor compositions to provide a barrier mixture;
   (3) providing batter comprising flour and water;
   (4) coating the barrier mixture onto the porous inner food structure thereby forming a barrier-coated porous inner food structure;
   (5) baking the resulting barrier-coated porous inner food structure to form a baked product;
   (6) coating the batter onto the resulting baked product to form a battered baked product; and
   (7) baking the resulting battered, baked product whereby a food product is produced having the properties of:
   (x) retention of a substantial quantity of the water originally contained in the porous inner food structure on storage and/or on cooking;
   (y) substantial imperviousness to the absorption or adsorption of cooking oil into said porous inner food structure when said article is contacted with cooking oil on storage and/or on cooking; and
   (z) retention of substantially all of the flavor nuances originally present in the macerated chicken meat or macerated beef.

2. The process of claim 1, wherein an additional barrier composition consisting of a starch, methyl cellulose and xanthan gum is coated onto the outer surface of the resulting product after step (7) thereby forming a re-coated product and the re-coated product is then re-cooked.

3. A process for preparing a food product consisting of the steps of:
   (1) providing a porous inner food structure consisting of water and macerated beef or macerated chicken;
   (2) mixing a starch, methyl cellulose, xanthan gum and one or more reaction flavor compositions and-/or reaction flavor precursor compositions to provide a barrier mixture;
   (3) providing a batter comprising flour and water;
   (4) coating the batter mixture onto the entire outer surface of the porous inner food structure thereby forming a barrier-coated porous inner food structure;
   (5) baking the resulting batter-coated porous inner food structure;
   (6) coating the barrier mixture on to the entire surface of the baked batter-coated porous inner food structure in order to form a barrier coated battered porous inner food structure; and
   (7) baking the resulting barrier coated battered porous inner food structure
whereby a food product is produced having the properties of:
   (x) retention of a substantial quantity of the water originally contained in the porous inner food structure on storage and/or on cooking;
   (y) substantial imperviousness to the absorption or adsorption of cooking oil into said porous inner food structure when said article is contacted with cooking oil on storage and/or on cooking; and
   (z) retention of substantially all of the flavor nuances originally present in the macerated chicken meat or macerated beef.

4. The process of claim 3, wherein an additional barrier composition consisting of a starch, methyl cellulose and xanthan gum is coated on the outer surface of the resulting product after step (7) thereby forming a re-coated product and the re-coated product is then re-cooked.

5. A process for preparing a food product consisting of the steps of:
   (1) admixing macerated beef or macerated chicken meat with a barrier composition consisting of a starch, methyl cellulose, xanthan gum and one or more reaction flavor compositions and/or reaction flavor precursor compositions to form a macerated meat-barrier composition mixture;

(2) compacting the resulting macerated meat-barrier composition mixture to provide a porous inner food structure;
(3) preparing a batter comprising flour and water;
(4) coating the batter onto the porous inner food structure thereby forming a battered porous inner food structure; and
(5) baking the resulting battered porous inner food structure whereby a food product is produced having the properties of:

(x) retention of a substantial quantity of the water originally contained in the macerated meat or macerated chicken on storage and/or on cooking;
(y) substantial imperviousness to the absorption or adsorption of cooking oil into said breaded porous inner food structure when said food article is contacted with cooking oil on storage and/or on cooking; and
(z) retention of substantially all of the flavor nuances originally present in the macerated chicken meat or macerated beef.

6. The process of claim 5 wherein the breading mixture is additionally admixed with a barrier composition consisting of a starch, methyl cellulose and xanthan gum.

7. A process for preparing a food product comprising the steps of:

(1) providing a porous inner food structure consisting of water and macerated beef or macerated chicken meat and one or more reaction flavor compositions and/or reaction flavor precursors;
(2) macerating beef and/or chicken meat;
(3) admixing the resulting macerated beef and/or chicken meat with a barrier composition consisting of a mixture of a starch, methyl cellulose and xanthan gum and one or more reaction flavor compositions and/or one or more reaction flavor precursors compositions in order to form a macerated meat-barrier coating composition;
(4) coating the resulting macerated meat-barrier coating composition onto the porous inner food structure; and then
(5) baking the resulting coated product whereby a food product is produced having the properties of:

(x) retention of a substantial quantity of the water originally contained in the porous inner food structure on storage and/or on cooking;
(y) substantial imperviousness to the absorption or adsorption of cooking oil into said porous inner food structure when said food article is contacted with cooking oil on storage and/or on cooking; and
(z) retention of substantially all of the flavor nuances originally present in the macerated chicken meat or macerated beef.

* * * * *